US012700783B2

(12) United States Patent
Rosen et al.

(10) Patent No.: US 12,700,783 B2
(45) Date of Patent: Aug. 4, 2026

(54) ELECTRIC DRIVE SYSTEM

(71) Applicant: DeepDrive GmbH, Garching bei München (DE)

(72) Inventors: Alexander Rosen, Osnabrueck (DE); Dean Petrovski, Munich (DE); Christopher Römmelmayer, Fuerstenfeldbruck (DE); Maximilian Habersbrunner, Munich (DE)

(73) Assignee: DeepDrive GmbH, Garching bei München (DE)

( * ) Notice: Subject to any disclaimer, the term of this patent is extended or adjusted under 35 U.S.C. 154(b) by 211 days.

(21) Appl. No.: 18/569,012

(22) PCT Filed: Jan. 23, 2023

(86) PCT No.: PCT/EP2023/051459
§ 371 (c)(1),
(2) Date: Dec. 11, 2023

(87) PCT Pub. No.: WO2023/165760
PCT Pub. Date: Sep. 7, 2023

(65) Prior Publication Data
US 2024/0291365 A1      Aug. 29, 2024

(30) Foreign Application Priority Data

Mar. 2, 2022    (DE) ..................... 10 2022 202 123.1

(51) Int. Cl.
*H02K 16/02*        (2006.01)
*H02K 1/18*          (2006.01)
(Continued)

(52) U.S. Cl.
CPC .............. *H02K 16/02* (2013.01); *H02K 1/18* (2013.01); *H02K 3/14* (2013.01); *H02K 3/28* (2013.01);
(Continued)

(58) Field of Classification Search
CPC . H02K 1/16; H02K 1/18; H02K 11/33; H02K 16/02; H02K 21/12; H02K 21/14;
(Continued)

(56) References Cited

U.S. PATENT DOCUMENTS 3,360,668 A    12/1967  Faulhaber
3,441,761 A     4/1969  Painton et al.
(Continued)

FOREIGN PATENT DOCUMENTS

CN        210592478 U      5/2020
CN        113691091 A     11/2021
(Continued)

OTHER PUBLICATIONS

Translation of Korean Office Action for corresponding Korean Patent Application No. 10-2024-7005354, issued Jan. 23, 2025, 21 pages.
(Continued)

*Primary Examiner* — Naishadh N Desai
(74) *Attorney, Agent, or Firm* — Westman, Champlin & Koehler, P.A.

(57)        ABSTRACT

The present invention relates to an electric drive system for or in a motor vehicle, having: at least one synchronous machine, which has a double rotor and a distributed winding placed in a stator core, wherein the double rotor is constructed from flux-carrying material made of solid material, wherein the winding is designed to be self-supporting for torque support; and at least one three-stage or multi-stage inverter circuit that is coupled to the synchronous machine at a load output and that is designed to convert a DC voltage received on the supply side into an AC voltage via which the synchronous machine can be driven via the load output, wherein the inverter circuit has a controllable three-stage or multi-stage inverter.

25 Claims, 16 Drawing Sheets

(51) Int. Cl.

| | |
|---|---|
| *H02K 3/14* | (2006.01) |
| *H02K 3/28* | (2006.01) |
| *H02K 3/48* | (2006.01) |
| *H02K 11/33* | (2016.01) |
| *H02K 21/14* | (2006.01) |
| *H02K 21/22* | (2006.01) |

(52) U.S. Cl.
CPC .............. *H02K 3/48* (2013.01); *H02K 11/33* (2016.01); *H02K 21/14* (2013.01); *H02K 21/22* (2013.01)

(58) Field of Classification Search
CPC ...... H02K 21/22; H02K 2201/06; H02K 3/12; H02K 3/14; H02K 3/28; H02K 3/48; H02K 3/50; H02K 11/30; H02K 2213/03; B60K 7/0007; B60L 50/60; H02M 7/483; H02P 2207/03; H02P 23/0027; H02P 25/022; H02P 27/14
See application file for complete search history.

(56) References Cited

U.S. PATENT DOCUMENTS

| | | | |
|---|---|---|---|
| 5,517,401 | A | 5/1996 | Kinoshita et al. |
| 6,710,492 | B2 | 3/2004 | Minagawa |
| 6,992,419 | B2 | 1/2006 | Kim et al. |
| 7,356,906 | B2 | 4/2008 | Kim et al. |
| 7,443,074 | B2 | 10/2008 | Kim et al. |
| 7,557,486 | B2 | 7/2009 | Choi et al. |
| 7,626,299 | B2 | 12/2009 | Yoshikawa et al. |
| 7,652,406 | B2 | 1/2010 | Kim et al. |
| 8,541,923 | B2 | 9/2013 | Leiber et al. |
| 10,050,480 | B2 | 8/2018 | Köhler et al. |
| 10,381,886 | B2 | 8/2019 | Gieras et al. |
| 10,581,342 | B2 | 3/2020 | Zhang et al. |
| 10,903,758 | B2 | 1/2021 | Fu et al. |
| 11,251,736 | B2 | 2/2022 | Vogelsberger et al. |
| 11,290,003 | B2 | 3/2022 | Tsuruma |
| 11,463,017 | B2 | 10/2022 | Drangmeister et al. |
| 2001/0008354 | A1 | 7/2001 | Minagawa |
| 2004/0245878 | A1 | 12/2004 | Kim et al. |
| 2006/0066173 | A1 | 3/2006 | Kim et al. |
| 2008/0054740 | A1 | 3/2008 | Kim et al. |
| 2008/0142284 | A1 | 6/2008 | Qu et al. |
| 2009/0072650 | A1 | 3/2009 | Yoshikawa et al. |
| 2009/0079286 | A1 | 3/2009 | Kim et al. |
| 2012/0007453 | A1 | 1/2012 | Leiber et al. |
| 2012/0133221 | A1 | 5/2012 | Leiber et al. |
| 2013/0270948 | A1 | 10/2013 | Unterfrauner |
| 2015/0108958 | A1 | 4/2015 | Xu et al. |
| 2016/0072343 | A1 | 3/2016 | Köhler et al. |
| 2016/0268951 | A1* | 9/2016 | Cho ........................ H02P 27/14 |
| 2017/0185130 | A1 | 6/2017 | Zhang et al. |
| 2017/0317607 | A1 | 11/2017 | Agirman et al. |
| 2018/0034353 | A1 | 2/2018 | Gieras et al. |
| 2018/0166931 | A1 | 6/2018 | Takahashi et al. |
| 2019/0013712 | A1* | 1/2019 | Kim ........................ H02K 3/26 |
| 2019/0238062 | A1 | 8/2019 | Lu et al. |
| 2021/0126569 | A1 | 4/2021 | Vogelsberger et al. |
| 2021/0359593 | A1 | 11/2021 | Tsuruma |
| 2022/0014112 | A1 | 1/2022 | Drangmeister et al. |
| 2022/0069685 | A1* | 3/2022 | Mao ........................ H02K 17/14 |
| 2023/0075792 | A1 | 3/2023 | Schafroth et al. |

FOREIGN PATENT DOCUMENTS

| | | |
|---|---|---|
| DE | 1188709 B | 3/1965 |
| DE | 1463855 A1 | 1/1969 |
| DE | 1613077 A1 | 6/1970 |
| DE | 4234129 C2 | 3/1995 |
| DE | 19704652 C1 | 7/1998 |
| DE | 102010055030 A1 | 6/2012 |
| DE | 102013206593 A1 | 10/2014 |
| DE | 102015226105 A1 | 6/2016 |
| DE | 202016106881 U1 | 12/2016 |
| DE | 102019109229 A1 | 10/2020 |
| DE | 102021207266 A1 | 2/2022 |
| DE | 102021003942 A1 | 2/2023 |
| DE | 102022202123 B4 | 9/2023 |
| EP | 1879283 B1 | 9/2015 |
| EP | 3280035 A1 | 2/2018 |
| EP | 3627677 A1 | 3/2020 |
| EP | 3780377 A1 | 2/2021 |
| EP | 3799290 A1 | 3/2021 |
| JP | H04-334976 A | 11/1992 |
| JP | 2001136606 A | 5/2001 |
| JP | 2001275320 A | 10/2001 |
| JP | 2021275320 A | 10/2001 |
| JP | 2003299393 A | 10/2003 |
| JP | 2011167044 A | 8/2011 |
| JP | 2012023901 A | 2/2012 |
| JP | 5554140 B2 | 7/2014 |
| JP | 2018082600 A | 5/2018 |
| JP | 2018133850 A | 8/2018 |
| WO | 2004004098 A1 | 1/2004 |
| WO | 2010099975 A2 | 9/2010 |
| WO | 2016065012 A1 | 4/2016 |
| WO | 2020099145 A1 | 5/2020 |
| WO | 2021253413 A1 | 12/2021 |

OTHER PUBLICATIONS

English translation of Office Action, including Search Report, for German Patent Application No. 10 2022 202 123.1, dated Nov. 8, 2022, 9 pages.

Ponick, B. et al., "Calculation of electrical machines," ISBN:978352740525, 2008 Wiley-VCH Verlag Gmbh & Co KGaA (only copy of english abstract available).

International Search Report (including English translation) and Written Opinion for International Application No. PCT/EP2023/051459, dated Apr. 21, 2023.

Office Action, including Search Report, for German Patent Application No. 10 2022 202 123.1, dated Nov. 8, 2022, 9 pages.

Salem, A. et al., "T-Type Multilevel Converter Topologies: A Comprehensive Review," Arabian Journal for Science and Engineering, (2018), https://doi.org/10.1007/s13369-018-3506-6.

Bubert, A. et al., "Experimental Validation of Design Concepts for Future EV-Traction Inverters," Institute for Power Electronics and Electrical Drives, (2018).

Häring, J. et al., "Efficiency and cost comparison of B6 and Hybrid ANPC Converters for Traction Drives," ISBN: 978-9-0758-1536-8 (2020).

Hoeck, H. v. et al., "Power Electronic Architectures for Electric Vehicles," DOI: 10.1109/EMOBILITY.2010.5668048, (Nov. 2010).

Lu, J. et al., "A GaN/Si Hybrid T-Type Three-Level Configuration for Electric Vehicle Traction Inverter," IEEE (2018).

Liu, H. et al., "A Comparative Analysis of the ThreeLevel NPC and ANPC Converter Loss Distribution," J. Electrical Systems 11-3 (2015): 271-280.

Nitzsche, M. et al., "Comprehensive Comparison of a SiC MOSFET and Si IGBT Based Inverter," (2019).

Schweizer, M., "Comparative Evaluation of Advanced Three-Phase Three-Level Inverter/Converter Topologies Against Two-Level Systems," IEEE Transactions On Industrial Electronics, vol. 60, No. 12, Dec. 2013.

Mukherjee, N. et al., "900V GaN-based sine-wave inverters for three-phase industrial applications," The 9th International Conference on Power Electronics, Machines and Drives (PEMD 2018), doi: 10.1049/joe.2018.8032.

Baek, S., "Performance Comparison Between Two-Level and Three-Level SiC-Based VFD Applications with Output Filters," IEEE Transactions On Industry Applications, vol. 55, No. 5, Sep./Oct. 2019.

Sezen. S. et al., "A Three-Phase Three-Level NPC Inverter Based Grid-Connected Photovoltaic System With Active Power Filtering," 16th International Power Electronics and Motion Control Conference and Exposition Antalya, Turkey Sep. 21-24, 2014.

(56) References Cited

OTHER PUBLICATIONS

Zhu, J. et al., "High Efficiency SiC Tration Inverter for Electric Vehicle Applications," IEEE (2018).
Translation of Japanese Office Action for Japanese Patent Application No. JP 2024-552249, dated Jul. 22, 2025, 19 pages.

* cited by examiner 105, 125

106

126

127

112

128 119

113

113

127

106

128

103

106 max min

ELECTRIC DRIVE SYSTEM

CROSS REFERENCE TO RELATED APPLICATION (S)

This application is a Section 371 National Stage Application of International Application No. PCT/EP2023/051459, filed on Jan. 23, 2023, entitled "Electric drive system", which published as WIPO Publication No. 2023/165760 A1, on Sep. 7, 2023, not in English, which claims priority to German Patent Application No. 10 2022 202 123.1, filed on Mar. 2, 2022, the contents of which are incorporated herein by reference in their entireties.

FIELD OF THE INVENTION

The present invention relates to an electric drive system for or in a motor vehicle.

TECHNICAL BACKGROUND

Electric machines having a stator and two rotors which are connected together for conjoint rotation, so-called double-rotor machines (in addition to double-rotor, also referred to as multi-rotor, dual-rotor etc.) can increase both the torque density and the efficiency of electric drives compared with conventional electric machines having only one rotor. This can be attributed to the fact that, particularly in the so-called "yokeless" design, no back iron is required in the stator and, as a result, the magnetic losses can be significantly reduced. In addition, with two rotors there is basically more space available for the field-exciting magnets (in the case of permanent magnet-excited synchronous machines, PSM) or the conductor material (in the case of induction machines, IM or electrically excited synchronous machines, ESM). According to the orientation of the magnetic field lines in the air gap, such machines can be divided into two groups, axial flux-carrying (field lines in parallel with the axis of rotation, so-called axial flux machines) on the one hand and radial flux-carrying (field lines in a radial direction in the air gap, so-called radial flux machines) on the other hand.

Axial flux double-rotor machines are described e.g. in DE 10 2015 226 105 A1 and DE 10 2013 206 593 A1. They are characterised by a high torque and power density, but are costly to manufacture because very complex geometries must be punched or manufactured using powder metallurgy in the stator core. To date, such machines have therefore not made the leap into large-scale production and are used only in niche areas with high power density requirements, such as racing, aviation, etc. In addition, the mechanical fastening concepts for the stator winding permit only the use of single-tooth windings which have corresponding disadvantages in relation to noise excitations.

In contrast, in the case of radial flux double-rotor machines, manufacturing methods can be used which are established in principle for the winding and laminated core and are suitable for large-scale production. However, in this case there is a significant and largely unresolved technical challenge in terms of supporting the torque produced in the stator core. By reason of the internally and externally rotating parts, the laminated stator core cannot be mounted (e.g. pressed-in, screwed or adhered) in a fixed housing, as is otherwise usually the case. Therefore, the torque is guided to the axial ends of the laminated stator core or stator winding and is supported at this location. In the prior art, various approaches have been proposed in this regard but all are associated with considerable disadvantages in relation to function and/or costs.

EP 1 879 283 B1 describes one way of designing the stator winding as a so-called yoke winding. The annular laminated stator core has in this case grooves on the inner and outer diameter, between which there is located a back iron (also referred to as a stator yoke) which is effective in a tangential direction. In this case, forward and return conductors of each winding strand are guided in grooves lying radially one above the other in each case and are wound around the yoke. The stator yoke is axially accessible between the winding strands and can be fixed on the housing e.g. by means of axial screw-connections (described e.g. in JP 2018 082 600). The axial compression of the screws ensures both the torsion stiffness of the laminated core and torque support at the axial end. The north pole and south pole of the rotor field are located opposite one another. A disadvantage of this concept is that the magnetic flux must be carried completely via the return yoke located between the stator grooves. On the one hand, this leads to an increased weight of the laminated stator core and increases the iron losses significantly. The magnetic field lines of both rotor fluxes are closed via the back iron in the laminated stator core and give rise to iron losses at this location. In addition, all individual coils of the yoke winding must be interconnected in parallel or in series in the region of the winding head, which in turn leads to a conflict over installation space with torque support. However, the winding wound around the yoke allows direct mechanical contacting of the laminated stator core.

A considerable weight and loss saving can be achieved if the magnetisation directions of the magnets lying radially one above the other point in the same direction and the current supply directions of the conductors lying one above the other in the grooves are identical. In this case, the back iron in the stator can be omitted and a so-called "yokeless" double rotor machine having a distributed winding. The magnetic field lines are closed over the rotor. A back iron in the stator is not required, as a result of which weight and iron losses in such machines are very low. However, the distributed winding does not permit direct mechanical contacting of the laminated stator core for torque support. For example, WO 2004/004098 A1 describes a yokeless embodiment having a distributed winding.

Also in the case of a so-called "yokeless" design, it can be expedient nevertheless to produce a thin yoke for mechanical connection of the stator teeth, but this is not necessary in terms of electromagnetism. The term "yokeless" thus refers to the electromagnetic flux carrying, in which no flux in a tangential direction is present in the stator. However, in this case the winding cannot be designed as a yoke winding because forward and return conductors of the winding strands are distributed radially on the periphery and thus form a distributed winding. This produces winding heads of distributed windings which impede accessibility of the laminated core in an axial direction. Moreover, the purely radial flux carrying precludes the use of axial, metallic screw connections because they form conductor loops with a lot of linked flux and high additional current heat losses. With respect to the axial support, various auxiliary constructions for torque support are proposed in the prior art, e.g. as described in DE 10 2010 055 030 A1 or U.S. Pat. No. 7,557,486 B2. The problem here is that electrically and/or magnetically conductive metals are not allowed to protrude into the flux-carrying region, or are allowed to do so only to a very limited extent, which severely restricts the material selection and geometric design. In contrast, synthetic material components, adhesives and/or casting materials can also be used in the flux-carrying region. However, with such materials it is very difficult to meet the stringent requirements with regard to temperature stability and mechanical strength.

In order to operate such a double-rotor machine for or in a motor vehicle, an inverter is provided by reason of the direct voltage applied to the output of suitable energy storage devices.

An inverter is an electric apparatus which converts direct voltage into alternating voltage. Such inverters are used e.g. in modern motor vehicles, in photovoltaics (solar inverters), as components in frequency converters and many other applications, in which a suitable alternating voltage is to be generated from a direct voltage. Such inverters and the fields of application thereof are generally known in a wide range of circuitry-wise variants, and so it is not necessary to discuss the circuitry-wise structure and mode of operation thereof in greater detail.

In the case of modern motor vehicles, electrically powered drive systems are increasingly being used-inter alia also for reasons of sustainability and to avoid $CO_2$ emissions. Such drive systems include e.g. one or more electric machines, such as for instance synchronous machines or asynchronous machines, which are powered by means of a multiphase alternating voltage. In general, in order to generate the alternating voltage, so-called two-level inverters (or 2 L inverters for short) are used. In the case of two-level inverters, an alternating voltage having two voltage levels is generated from the direct voltage of a direct voltage source.

Two-level inverters have become established over other inverter topologies, in particular in the field of drive inverters for electric vehicles. At the present time, IGBT switching elements are used predominantly in two-level inverters. An example of such a two-level inverter is described e.g. in the paper by H. v. Hoeck, "Power Electronic Architectures for Electric Vehicle" which appeared in the book "Emobility-Electrical Power Train" published by IEEE in 2010.

In addition to the two-level inverter topology just mentioned, three-level or multi-level inverter topologies also exist, by means of which three-level or multi-level voltage levels can thus be generated. Examples of multi-level inverter topologies are described e.g. in U.S. Pat. No. 10,903,758 B2 or US 2017/0185130 A1.

The advantages of multiple voltage levels are lower harmonics, a slower voltage change at the phase outputs, low electromagnetic emissions (EME) and, above all, the processing of higher voltages. For these reasons, such three-level or multi-level inverters are currently used primarily for high-voltage applications. Power engineering applications, such as e.g. solar inverters or wind turbines, are established fields of application for such three-level or multi-level inverter topologies. Higher voltages are not to be found in electric vehicles (with voltages of e.g. 400 V). In contrast, in photovoltaics, voltages of more than 1 kV are common, and in the case of other renewable energies, such as wind energy, the voltages are significantly higher.

However, the advantages of three-level or multi-level inverters just mentioned are not sufficient, according to the prevailing opinion, to justify the use thereof in electric drives of electric vehicles, as stated in the article by Andreas Bubert et. al, "Experimental Validation of Design Concepts for Future EV-Traction Inverters", 2018 IEEE Transportation Electrification Conference and Expo (ITEC), pages 795-802. For all of these reasons, three-level or multi-level inverter topologies are not used in electrically driven motor vehicles today.

SUMMARY OF THE INVENTION

It is now an aspect of the present invention to improve the efficiency of an electric drive system equipped with a double rotor, and at the same to enable simpler and more cost-effective production.

Accordingly, the following is disclosed:

an electric drive system for or in a motor vehicle, comprising: at least one synchronous machine which has a double rotor and a distributed winding placed in a stator core, wherein the double rotor is constructed from flux-carrying material consisting of solid material, wherein the winding is designed to be self-supporting for torque support; and at least one three-level or multi-level inverter circuit which is coupled to the synchronous machine at a load output and which is designed to convert a direct voltage received on the supply side into an alternating voltage, via which the synchronous machine can be driven via the load output, wherein the inverter circuit has a controllable three-level or multi-level inverter.

One of the ideas of the present invention resides in a combination of a specific electric synchronous machine having a double rotor, of which the stator is designed having a distributed winding designed to be self-supporting for torque support, and of which the double rotor is formed from solid rotor material, i.e. in a solid construction, and a three-level or multi-level inverter circuit.

The torsionally stiff winding offers for the first time the possibility of designing the winding of a synchronous machine with a double rotor, in particular a yokeless double rotor machine, as a distributed winding with a correspondingly small upper field spectrum. Only in this embodiment can the rotors be manufactured from solid material because only small upper fields and resulting eddy currents are generated in the rotor by the winding. The manufacture of rotors is thus massively simplified and much more cost-efficient. The inventive embodiment of an electric drive system thus offers considerable technological and economical advantages because material costs and complexity in the rotor are reduced.

However, if such a machine were to be operated with a two-level (2-level) inverter—as is common in electric machines in the prior art—the current harmonics induced by the inverter would cause eddy currents and additional losses in the rotors consisting of solid material. These harmonic losses are relevant particularly in the case of low output torques and greatly reduce the degree of efficiency.

Through the inventive use of the combination of rotors consisting of flux-carrying solid material and a three-level or multi-level inverter, the causal harmonics in the input voltage can be significantly reduced, which leads to a reduction in losses by more than 75%. Since the harmonic losses in electric machines in the prior art do not play a significant role, this would not justify the additional costs of a three-level inverter.

It is only in this specific case that the inventive combination of features can be considered to be advantageous. It is a basic finding in this case that electric machines having a double rotor consisting of solid material have high losses in the rotor when powered from a conventional 2 L inverter.

In design terms, the losses in the electric machine cannot be reduced or can only be reduced insignificantly. Reducing the losses by increasing the frequency in 2 L operation has only a slight effect and increases the losses in the inverter, which, in turn, influences the overall efficiency.

The basic mechanism for reducing the losses in the solid material of the double rotor is based on the fact that the amplitude of the particular magnetic flux density in the solid material of the double rotor which does not contribute to torque formation should be reduced. This portion which is defined by harmonics in the flux density is approximately directly proportional to the change in THD-induced losses in the square of its amplitude. Thus, a change in the inverter switching frequency leads to an indirectly proportional linear change in the losses and is therefore less effective.

A reduction in losses in the solid material contributes substantially to the reduction in the overall losses of the electric machine and to economical usage thereof. Thus, the resulting finding, which is part of the present invention, is that the losses in the electric machine can be effectively reduced by means of an inverter circuit which reduces exclusively the amplitude of the harmonics in the flux density.

In order to achieve this, the following measures and aspects were considered in the configuration and selection of the mode of operation of the inverter:

The function of the 2 L inverter is replaced by the function of a 3 L inverter in order to reduce the harmonics at the phase outputs of the inverter. As a result, the harmonics in the flux density and in the stator current are reduced. A change in frequency is not necessary for this purpose.

The losses are likewise reduced by increasing the switching frequency in 2 L operation but this is not carried out because, as a result, the switching losses in the inverter would likewise greatly increase and therefore the overall efficiency is not significantly improved. Although an increase in the switching frequency could positively support the loss optimisation, it is not an essential aspect of the solution in accordance with the invention.

In contrast, the 3 L inverter used offers three voltage levels (3 L) and is possibly (but not necessarily) three-phase. A relatively high cost efficiency can be achieved with three voltage levels and three phases. However, the system can be extended to any number of phases and to any number of voltage levels with all phases being of the same design.

In contrast to known 2 L inverters, the power losses in the electric machine are greatly reduced in the operation of a 3 L inverter in accordance with the invention by reason of the lower harmonics. The switching losses of the 3 L inverter are likewise comparatively reduced, but the conducting state losses are increased.

Both in the electric machine and in the 3 L inverter, the prevailing loss mechanisms change in dependence upon the load. In 3 L operation, the harmonics are lower, and so the machine losses are greatly reduced. Losses induced by harmonics are dominant in the case of low currents. In the case of larger currents, the prevailing loss mechanism changes and resistive conduction or copper losses dominate, whereas losses induced by harmonics are more likely to be subordinate or turn out to be comparatively low. Switching losses in the inverter are reduced in the 3 L inverter in comparison with 2 L inverters (approximately by 50%). In the case of small loads (currents), these switching losses prevail, whereas in the case of larger currents conduction losses dominate and 2 L operation is more efficient. These findings lead to the inventive concept of using a 3 L inverter in the case of low loads and of using a 2 L inverter in the case of high loads. This operation is possible by means of the controllable three-level or multi-level inverter in accordance with the invention.

Overall, the advantages of 2 L operation can thus be combined with the advantages of 3 L operation—above all in the case of electric machines equipped with double-rotor motors—in order to significantly improve the overall efficiency of the electric drive system compared to known electric drive systems.

A further finding forming the basis of the present invention is that a winding of a radial flux double-rotor machine can be designed to be power-transmitting for torque support. One aspect forming the basis of the present invention is thus to design the winding arranged in the stator core to be self-supporting for torque support.

A self-supporting design of the winding is to be understood to mean that sufficient stiffness and strength of the winding for supporting the drive torque with respect to torsion about the machine axis are provided. The self-supporting winding is embedded in particular into a soft-magnetic stator core for magnetic flux carrying. This offers the particular advantage that the stator core itself does not require any inherent torsion stiffness in relation to the machine axis and also no other auxiliary construction for fixing the stator core is required. On the contrary, the torque is supported, in particular completely, by means of the winding.

The winding is a so-called distributed winding. This is to be understood to mean that forward and return conductors of the winding strands are distributed in a tangential direction on the periphery such that, between forward and return conductors of one strand, the conductors of another strand are positioned in each case in a tangential direction. This creates a nested arrangement which requires crossing of conductors of different strands, in particular in the winding head region. In particular, distributed windings are in contrast to so-called toothed coil windings, in which the forward and return conductors of a strand lie in adjacent grooves in each case, which leads to crossing-free winding heads.

Therefore, a functional integration which is hitherto unknown or technically unfeasible in the field of radial flux double-rotor machines is provided, in that the distributed winding is given a supporting function to support the torque in addition to current conduction. For example, mechanical fixing of the winding outside the stator core can be provided for this purpose at one axial end.

In order to produce such a winding, integral manufacture of the winding in the existing stator core is proposed. For this purpose, the individual bars of the winding are inserted in an axial direction following the helical line of the stator grooves through the radially inner and radially outer stator grooves and are connected at the conductor ends. Possibly, an integrally bonded connection by welding or soldering is provided in this case. Therefore, the winding is form-fittingly connected to the stator core. The selected lead angle (also setting angle) of the stator grooves or the helical lines described therewith ensures that, by connecting the conductor bars introduced, conductor loops nested one inside the other are formed which thus form a distributed winding. The angle of the conductor loops in the machine, which are swept in relation to the centre axis, encloses in each case a magnetic pole of the rotors. In this manner, despite the functional integration, very simple production of the stator is made possible, which manages with very few components and comparatively simple conventional connection technology and thus also with very few manufacturing steps.

The stator designed in this way can now be completed with inner and outer rotors consisting of solid material to form a synchronous machine of an electric drive system in accordance with the invention. This relates e.g. to permanent magnet-excited rotors having surface magnets and/or buried magnets, short-circuit rotors or electrically excited rotors. Hybrid variants with different rotor variants in the inner and outer rotor can also be provided. A particularly advantageous embodiment is provided if the rotors consist of soft magnetic solid material and are produced having surface-mounted permanent magnets. The small upper field spectrum of the winding variants described in this case and the distance between the solid material and the air gap ensured by the magnets prevent the occurrence of unacceptably large losses by reason of eddy currents in the rotors. In this embodiment, comparatively high degrees of efficiency can then be achieved in an advantageous manner and the rotors can still be manufactured cost-effectively. The synchronous machine can be integrated e.g. into a vehicle axle and be provided in order to drive a drive wheel. In particular, the synchronous machine can be coupled without a transmission to the drive wheel.

Also disclosed according to one aspect is thus an electric drive system in accordance with the invention having a vehicle axle, in particular for a motor vehicle, wherein the synchronous machine having a double rotor is coupled without a transmission to a drive wheel.

Also disclosed according to one aspect is a motor vehicle having such an electric drive system.

Advantageous embodiments and developments are apparent from the further dependent claims and from the description with reference to the figures of the drawing.

According to one advantageous embodiment, the synchronous machine is designed as a radial flux double-rotor machine. The construction in accordance with the invention ensures that, by reason of the functional integration, the mass of a radial flux double-rotor machine can be reduced and the torque density can be increased.

According to an embodiment, the synchronous machine is designed for a wheel hub drive, in particular as a wheel hub motor for an electrically operable motor vehicle. A wheel hub motor is an electric machine which is installed directly into a wheel and in particular into the hub of a vehicle and at the same time supports the wheel hub. A part of the hub motor transmits the generated torque directly to the wheel which is to be driven and with which it revolves. The main advantage of such electric wheel hub motors in vehicles compared to drive concepts having a central motor is the elimination of the classic drive train including the components required in each case according to specification (transmission, cardan shaft, differential gear, drive shaft, etc.). Since their transmission losses are also eliminated, there are potentials for increasing the degree of efficiency of the entire drive system. Efficient recuperation, i.e. recovery of electrical energy during braking of the vehicle, can also be implemented in an electric wheel hub motor.

According to an embodiment, this relates to a wheel hub drive having a radial flux double-rotor machine. The construction in accordance with the invention which reduces the mass of a radial flux double-rotor machine and increases the torque density enables a reduction in unsprung masses, which is particularly advantageous for wheel hub motors, in a vehicle axle. Furthermore, in accordance with the invention a comparatively short axial length can be achieved with a comparatively large diameter, which is particularly advantageous in the wheel interior in relation to torque support and installation space. On the other hand, in accordance with the invention, in spite of the extremely compact design very high torques are also possible, in particular they are high enough in order to drive a wheel of a vehicle directly without a transmission. Thus, in a particularly advantageous manner transmission losses are avoided, further weight is saved and particularly high advantages in terms of the degree of efficiency can be achieved. Furthermore, this high torque which, for installation sizes within the dimensions of standard motor vehicle rims, is already possible in the four-digit range, in particular greater than 5000 Nm, and thus already extends into the range of the limit of liability of standard road tyres, even allows a rear axle wheel brake to be replaced by the wheel hub motor. Therefore, in the application as a wheel hub motor particular synergies are made possible.

According to one embodiment, the winding protrudes, at at least one axial end, beyond the stator core. Furthermore, a support device is provided which is arranged axially offset with respect to the stator core and is designed for form-fitting engagement with the winding at the at least one axial end for torque support. In this manner, the self-supporting winding is form-fittingly engaged with the support device, which is arranged axially offset with respect to the stator core, for torque support.

According to one embodiment, the synchronous machine has a mechanically fixed base. The support device is in form-fitting engagement with the at least one axial end of the winding for torque support and is supported on the base. The support device is fixedly connected, by means of a suitable method, to the base as the stationary part of the synchronous machine. One possible embodiment provides for this purpose cut-outs, e.g. through-bores, for force-fitting fastening means, such as e.g. screws. However, in addition or alternatively it would of course also be feasible to use form-fitting connecting means and/or an integrally bonded connection.

According to one embodiment, the double rotor has a first rotor consisting of solid material arranged radially within the stator core, and a second rotor consisting of solid material arranged radially outside the stator core. Possibly, the rotors are fixedly coupled, e.g. stamped, riveted or screwed, to one another.

According to one embodiment, the flux-carrying material in the double rotor or in the first and second rotor consists of iron or an iron alloy. The magnetic flux is thereby advantageously optimised.

According to an exemplified embodiment, the synchronous machine is a three-phase synchronous machine. In this case, the inverter circuit may be designed at least as a three-phase inverter. It is also a finding of the present invention that synchronous machines which use a three-phase or multiphase inverter topology demonstrate a substantially improved overall efficiency of the drive system.

According to one embodiment, the inverter circuit has an operating mode setting device which is designed to change the inverter from three-level or multi-level operation to two-level operation and vice versa in dependence upon an overall efficiency of the electric drive system, wherein the overall efficiency is a function of the detected phase current of the synchronous machine as well as at least one further parameter and/or property of the synchronous machine influencing the overall efficiency.

According to a further embodiment, the inverter circuit has an operating mode setting device which is designed to change the inverter from three-level or multi-level operation to two-level operation and vice versa in dependence upon an overall efficiency of the electric drive system, wherein the overall efficiency is a sole function of the detected phase current of the synchronous machine or a function of at least one further property of the synchronous machine influencing the overall efficiency.

According to one embodiment, the operating mode setting device has an evaluation device which is designed to optimise the overall efficiency on the basis of the phase current or the at least one further property. According to one aspect of the present invention, it has a specific inverter circuit associated with an adaptation of the entire drive system, which allows an increase in the overall benefit but without an increase in costs being associated therewith. For this purpose, the use of a novel controllable three-level or multi-level inverter is proposed, which can be operated in three-level or multi-level operation (hereinafter referred to as 3 L operation) and in two-level operation (hereinafter referred to as 2 L operation). An operating mode setting device provided specifically for this purpose sets the respective operating mode by activating the power switches of the inverter in a suitable manner. The operating mode is set according to the overall efficiency of the entire drive system- and thus not for instance merely on the basis of the synchronous machine and/or the inverter used. For the overall efficiency, in addition to the detected phase current of the synchronous machine—as also with other inverters-further parameters and/or properties of the synchronous machine influencing the overall efficiency are additionally also taken into consideration. In the case of known drive systems, the latter is not taken into consideration at all for the assessment of efficiency and analysis of efficiency. In accordance with the invention, a holistic analysis of efficiency is performed in this case.

It is now a concept of the present invention to reduce the losses primarily for small loads by operating the inverter in this case in 3 L operation. In this case, the losses of the inverter are at most increased insignificantly or even reduced in all operating points. The overall efficiency of the drive system, i.e. the inverter and the synchronous machine, thus increases significantly, in particular when used in electrically driven vehicles.

According to an aspect of the present invention, the inverter circuit has an operating mode setting device. It is essential that the operating mode setting device does not necessarily perform a hard switch from 2 L operation to 3 L operation and vice versa. On the contrary, it would also be feasible if such a switch-over occurred successively instead, e.g. in that fading from the inner power switches to the outer power switches takes place. This fading can be performed e.g. taking into consideration the average current values of the different power switches, so that the operating times or the times when the respective power switches are switched on are taken into consideration. In addition or alternatively, it would also be feasible if the power switches are switched according to a specified sequence and/or slowly.

The operating mode setting device which has e.g. an evaluation device, a control device and/or measuring devices can be designed e.g. as a program-controlled device, such as for instance as a microprocessor or microcontroller. However, it would also be feasible to have a logic circuit, such as for instance an FPGA, PLD or the like, for this function.

According to one advantageous development the operating mode setting device has an evaluation device. The evaluation device is designed to optimise the overall efficiency of the electric drive system on the basis of the phase current and on the basis of the at least one further parameter and/or the at least one property of the electric drive system.

Typically, but not necessarily, the overall efficiency is calculated numerically by the evaluation circuit. In addition or alternatively, the overall efficiency can be determined on the basis of a specified family of characteristics which is mapped e.g. in a lookup table. The determination of the overall efficiency can be calculated or determined during operation or e.g. in advance. For example, in a so-called offline operation the optimum, i.e. most efficient possible operating strategy is calculated, e.g. numerically, before the operation of the electric drive system. This can be achieved with comparatively few computer resources and is to be preferred above all when a large number of parameters are taken into consideration in the numerical projection of the optimum overall efficiency. In addition, for the offline operation more time is available for the calculation. Alternatively, however, a very dynamic determination of the respective operating mode (2 L operation or 3 L operation) would also be feasible and possible in a so-called real-time operation, e.g. via a lookup table. This is particularly advantageous and possible if a smaller number of parameters are used for the overall efficiency calculation. For example, for these purposes it would be possible to use a trained artificial network which has been trained on the basis of previous parameter values, characteristic curves and the like.

According to an embodiment, the evaluation device has an optimisation module which is designed to initially determine the overall efficiency. Alternatively or additionally, the overall efficiency can subsequently be optimised via an optimisation function, taking into consideration the phase current as well as the at least one further parameter and/or property. The optimisation of the overall efficiency can be effected analytically and/or via a suitable lookup table which has been generated e.g. beforehand.

At least one of the following parameters is provided as a further parameter:

temperature of the inverter circuit;
temperature of the synchronous machine;
intermediate circuit voltage of the inverter;
rotor speed or rotor rotational speed;
torque of the synchronous machine;
degree of modulation
phase voltage or phase current.

Of course, it would also be feasible to use further parameters.

The operating mode used in each case (e.g. 2 L operation or 3 L operation) would be e.g. a property of the synchronous machine influencing the overall efficiency. A further property can be seen in the specific configuration of the rotor of the synchronous machine, for instance in the way that the rotor is a double rotor and/or that the double rotor is formed from flux-carrying material consisting of solid material.

According to an exemplified embodiment, the operating mode setting device has at least one measuring device:

A first measuring device has at least one sensor input, via which the first measuring device can be coupled to the synchronous machine. The first measuring device is designed to detect the phase current, the temperature, the rotor speed and/or other measurable parameters. For example, the temperature of the synchronous machine or the rotors thereof can be detected via corresponding thermocouples. Alternatively, the change in the temperature-dependent electrical resistance of specific conductors and semiconductors or for instance specific semiconductor circuits can be used for temperature measurement in order to generate a voltage proportional to the absolute temperature (keyword: band gap reference). Although the torque of the synchronous machine cannot be detected directly, it can be calculated, inter alia, by measuring the phase current. The rotational speed of the rotor and therefrom the rotor speed can be determined in various ways, e.g. using a Hall sensor or an incremental encoder attached to the rotor.

A second measuring device is arranged and designed in order to detect the temperature and/or the intermediate circuit voltage of the inverter. The temperature measurement can be performed in a similar manner to the manner above in relation to the first measuring device.

According to an exemplified embodiment, the inverter includes a t-type neutral point clamped (TNPC) inverter architecture.

They have a variety of advantages over multi-level active neutral point clamped (ANPC) inverter topologies: in contrast to ANPC topologies, not four, but a maximum of three switches are conductive in series and thus the conducting state losses are lower. The output voltage waveforms are identical, which leads to similarly low switching losses, but at higher switching frequencies (e.g. >10 kHz), the required total chip area of the TNPC topology is less compared to the two-level topology. Similar to ANPC, a hybrid inverter topology can be constructed for TNPC in order to further increase the efficiency and/or optimise the production costs. For example, different switch technologies can be used for this purpose in the zero potential or middle bridge branch. Especially in the case of a TNPC inverter constructed completely with insulated gate bipolar transistors (IGBTs), the losses can be drastically reduced using gallium nitride (GaN). A use of the hybrid TNPC inverter topology in motor controls also in electric vehicles is possible, but is not found in practice. It is particularly advantageous to design the 3-level converter as a T-type converter, wherein the centre point switches have a considerably lower current-carrying capability than the outer switches. In the range of low output torque, the converter is then operated in 3 L operation and in the range of high output torque it is operated in 2 L operation. The advantage of this embodiment is that the harmonic losses are avoided in the range of small output torques, where they are of particular relevance.

TNPC-based 3 L inverters can be operated in two operating modes in order to increase system efficiency. In the case of 3 L TNPC inverters, the zero potential (middle) bridge branches can be switched off in order to operate in 2 L operation, and are switched on in order to change to 3 L operation. A switch is made between the two operating modes in order to increase the degree of system efficiency. For this purpose, the load is measured in the control and regulating logic and a switch is made between 2 L and 3 L operation with the aid of a previously determined optimisation characteristic curve.

In addition or alternatively, TNPC-based 3 L inverters are designed asymmetrically in order to reduce the costs of the inverter. The asymmetry relates to the current-carrying capability of the zero-potential (middle) bridge branches which is less than that of the outer bridge branches. This is possible because the zero-potential bridge branches are no longer used in the case of higher loads in order to optimise the overall efficiency. The outer bridge branches are designed for peak currents and the zero-potential bridge branches are designed for small or continuous currents.

According to one exemplified embodiment of the invention, the inverter has a first driver level and at least one second driver level. The second driver level is designed to carry output load currents to the load output which are smaller than the output load currents provided by the first driver level.

In an embodiment, the operating mode setting device is designed to control the inverter in such a manner that, depending upon the overall efficiency, the first driver level and the second driver level are activated in three-level or multi-level operation and at least one of the driver levels, for example the inner, second driver level, is deactivated in two-level operation.

Typically, but not necessarily, the first driver level has at least one bridge circuit, in particular a half-bridge circuit, of which the centre tap forms the output load connection of the inverter circuit. Each bridge circuit has at least one first (semiconductor) power switch which is connected to a first supply connection (to which e.g. a positive supply potential is applied) and which is designed to provide a first voltage level at the load output. Furthermore, each bridge circuit has at least one second (semiconductor) power switch which is connected to a second supply connection (to which e.g. a negative supply potential or a reference potential is applied) and which is designed to provide a second voltage level at the load output. The semiconductor-based power switches can be produced with various semiconductor materials which can be selected arbitrarily. Typically used materials are Si (silicon) for IGBTs and MOSFETs, SiC (silicon carbide) for MOSFETs and GaN (gallium nitride) for MOSFETs.

Typically, but not necessarily, the second driver level has at least one third power switch, of which the load paths are connected in series between an intermediate circuit and the centre tap of the first driver circuit. The power switches of the second driver level are designed to provide a third voltage level at the load output, said voltage level being between the first and the second voltage level.

In the case of a possible, so-called homogeneous inverter topology, all power switches of the inverter, i.e. the power switches of the first driver level and/or the second driver level, are designed as semiconductor switches of the same switch type and/or the same semiconductor technology. Switch types are e.g. bipolar transistors, field-effect transistors (such as MOSFETs, JFETs, etc.), thyristors, IGBTs, etc. Semiconductor technology refers to the semiconductor technology, on the basis of which the power switch is produced, such as for instance Si, SiC, GaAs or GaN technology.

In a first variant of the homogeneous inverter topology, the semiconductor switches are designed as GaN power switches, e.g. as GaN MOSFET. In a second variant, the semiconductor switches are designed as SiC power switches, in particular as SiC MOSFETs. Furthermore, IGBT-based power switches, e.g. silicon-based IGBTs with an Si diode or SiC diode, are likewise feasible.

In the case of a so-called hybrid inverter topology, at least two different switch types and/or at least two different semiconductor technologies are provided for the semiconductor switches of the inverter, i.e. for the semiconductor switches of the first driver level and/or for the semiconductor switches of the second driver level. In the case of the hybrid inverter topology, the same semiconductor materials are not used for all power switches within the inverter. In particular, a different technology (different switch types) is used for the power switches of the zero-potential bridge branch, i.e. for the second driver level, than is used for the outer switches of the first driver level. Therefore, it is possible to achieve efficiency advantages as a result of reduced switching losses and conduction losses. In addition, cost advantages are also achieved. It is particularly recommended to optimise the power switches in the zero-potential bridge branches (second driver level) for low switching losses and the lowest possible reverse recovery losses. This is expedient because the zero-potential bridge branches (second driver level) are activated in the case of low currents and low reverse recovery losses also reduce the switching losses in the outer switches. A hybrid design is to be particularly recommended if the inverter is designed asymmetrically. The lower the current-carrying capability of the zero-potential bridge branches (second driver level), the lower the additional costs for switching loss-optimised switches.

In a first variant, the semiconductor switches of the first driver level are designed as IGBTs (silicon or SiC) having a free-wheeling diode. In this case, the semiconductor switches of the second driver level can be designed as SiC power switches, in particular as SiC MOSFETs.

In a second variant, the semiconductor switches of the first driver level are designed as SiC MOSFETs. In this case, the semiconductor switches of the second driver level can be designed as GaN-based MOSFETs.

In a third variant, the semiconductor switches of the first driver level are designed as IGBTs having a free-wheeling diode. In this case, the semiconductor switches of the second driver level can be designed as GaN power switches, in particular as GaN MOSFETs.

According to an exemplified embodiment, the flux-carrying material in the rotor consists of iron or an iron alloy. Electric rotary field machines—and in this case for example synchronous machines having a double rotor—can be designed with flux-carrying material in the rotor in a solid design, i.e. consisting of solid material. This can be substantiated by the fact that, in an idealised view of synchronous machines, no periodic relative movement takes place between the direction vector of the rotating field generated by the stator winding and the double rotor. The magnetic flux density in an operating point is thus constant and no iron losses occur in the material. In the case of such permanent magnet-excited machines, of which the magnets are mounted on the rotor surface, the distance between the inductor grooves and the flux-carrying material ensured thereby allows the use of solid material without an increase in additional losses.

According to a likewise exemplified embodiment, the synchronous machine has a stator with an inductor, wherein the inductor is designed to carry a primarily radial magnetic flux, in particular in order to avoid magnetic flux carrying in a tangential direction. This is therefore a so-called "yokeless" design of the stator which avoids, in particular, magnetic flux carrying in a peripheral direction. A magnetic back iron in the inductor is not required, whereby weight and iron losses are reduced.

According to one embodiment, the inductor of the stator has a radial yoke thickness which is less than 30%, preferably less than 20%, particularly preferably less than 10% of an overall radial inductor thickness. In the case of a so-called "yokeless" design, a mechanical connection of the inductor teeth is nevertheless provided in this manner, which, however, would not be electromagnetically necessary and via which no functionally relevant magnetic flux takes place either. The term "yokeless" thus relates to the electromagnetic design of the inductor.

According to one embodiment, the winding is designed to be torsionally stiff such that a torque acting upon the stator core during the operation of a radial flux double-rotor machine can be supported, in particular completely, via the torsionally stiff winding on the support element. In this manner, all other types of force support devices, in particular for the stator core, can be advantageously omitted.

According to one embodiment, the stator core is designed for carrying a primarily radial magnetic flux. This is therefore a so-called "yokeless" design of the stator core which avoids, in particular, magnetic flux carrying in a peripheral or tangential direction. A magnetic back iron in the stator core is not required, whereby weight and iron losses are reduced.

According to one embodiment, the stator core has a radial yoke thickness which is less than 30%, preferably less than 20%, particularly preferably less than 10% of an overall radial stator core thickness. In the case of a so-called "yokeless" design, a mechanical connection of the stator teeth is nevertheless provided in this manner, which, however, is not electromagnetically necessary and via which no functionally relevant magnetic flux takes place either. The term "yokeless" thus relates in particular to the electromagnetic flux carrying of the stator core.

According to one embodiment, the winding is formed from conductor bars which are connected together, in particular in the manner of a bar structure. In particular, the conductor bars can be connected in an integrally bonded manner, e.g. by welding or soldering. However, other connection techniques would also be feasible. For example, two conductor bars are each connected at the conductor bar ends and all conductor bars together form such a bar structure. The bar structure formed with the conductor bars is advantageously configured in a torsionally stiff manner per se and is designed for transmitting torque about the centre axis of the stator. Furthermore, the conductor bars are designed having a thickness sufficient for the transmission of power. In the case of a wheel hub motor, the thickness of the conductor bars can be e.g. in the range of several millimetres. In particular, they can be bars having a square profile with edge lengths of several millimetres.

According to one embodiment, the winding has a radially inner layer of helically arranged conductor bars and a radially outer layer of oppositely helically arranged conductor bars. In this manner, a bar structure is formed by the winding and has a high torsion stiffness. The conductor bars of the inner layer and the conductor bars of the outer layer each describe a helical line, of which the turning directions or pitches are opposed to one another. An angle—swept in relation to the centre axis of the stator—of the helical line between the beginning and the end of a conductor bar is designed in particular in such a manner that one conductor loop is formed per pole of the rotors in a radial flux double-rotor machine. The swept angle to be provided can thus be calculated from the quotient of a whole revolution ($2\pi$ or 360°) and twice the number of pole pairs p.

According to one embodiment, the radially inner layer and the radially outer layer of the winding have in each case the thickness of an individual conductor bar. That is to say that a phase of the winding is formed in each case having the cross-section of an individual conductor bar. Such a winding design in accordance with the invention is made possible, inter alia, by the specific design of the radial flux double-rotor machine which prevents the current displacement to the surface, which is otherwise present in conductors, by means of the magnetic symmetry thereof. This permits comparatively thick conductor cross-sections and a relatively uniform current distribution is still achieved over the cross-section. For example, the thickness of the conductor bars can be in the range of several millimetres. In particular, they can be bars having a square profile with edge lengths of several millimetres, e.g. in the range of 2 mm to 6 mm, in particular in the range of 3 mm to 5 mm. Other cross-sectional shapes are likewise possible.

According to one embodiment, the conductor bars are each twisted corresponding to the helical course such that a cross-section of a conductor bar is the same at each point of the conductor in relation to a radial axis of the cross-section. This relates, in particular, to a torsion of a conductor bar, in particular a non-round conductor bar, about the centre axis of the stator or the machine. Depending upon the course of the helical shape, the conductor bars can additionally also be bent. The inner and outer layers are arranged in an interlaced manner, i.e. rotated, twisted and possibly bent in opposite directions, with respect to one another. In this manner, from a mechanical viewpoint the orientation of a conductor bar is oriented ideally for power transmission with the stator core at each point of the stator core, so that the respective conductor bar is loaded uniformly over its length. Therefore, in the resulting bar structure the conductors advantageously absorb predominantly tensile and compressive stresses when subjected to tangential force. In this manner, load peaks and deformations of the conductor bars are avoided. In particular when compared to a design with axis-parallel, straight conductors, the mechanical stresses can thus be significantly reduced.

According to one embodiment, the conductor bars of the radially inner and outer layer associated with the same phase of the winding are connected together in each case at the conductor bar ends, in particular via a radially arranged conductor bar piece and/or by means of an integrally bonded connection. In addition to a conductor loop, this also creates a torsionally stiff bar structure-like construction so that, when an axially accessible winding end is fixed, a high torque can be absorbed by the winding without causing unacceptably large deformations and/or stress states. Therefore, the self-supporting design of the winding is made possible only by the winding material, e.g. copper, without additional support means or elements.

According to one embodiment, the stator core contains a laminated stator core with helically extending stator grooves corresponding to the course of the winding, wherein an individual conductor bar is arranged in each stator groove of the laminated stator core. The winding or the self-supporting bar structure formed therewith is thus embedded in the laminated stator core. In a similar manner to the conductor bars of the winding, the stator grooves thus change their tangential position in dependence upon the axial position, producing the helical shape. The direction of the change in position follows the conductor bars, i.e. the centre line of the radially outer grooves and the radially inner grooves likewise describe a helical line, of which the turning directions are opposed.

In the case of further embodiments, other types of production known to a person skilled in the art for producing the stator core geometry in accordance with the invention having the radially inner and outer stator grooves extending helically in opposite directions would also be feasible, in particular also additive types of production, such as sintering methods or the like.

According to one embodiment, only one single conductor bar is placed in each stator groove of the laminated stator core. As already explained in relation to the winding, the conductor bars of the inner and outer stator grooves are helically interlaced against one another by torsion about the centre axis of the machine, so that the conductor ends of the inner and outer layers are guided towards one another. The conductor bars are conductively connected together at the conductor bar ends, in particular via a radially arranged conductor bar piece and/or by means of an integrally bonded connection, e.g. by welding or hard soldering.

According to one embodiment, the conductively connected conductor bars of the inner and outer layer together form wave-shaped winding strands. The winding strands can be interconnected to form a rotational field-generating winding with a desired or adjustable number of strands by means of corresponding interconnections which are known to a person skilled in the art. The voltage-retaining number of strand turns is determined directly from the quotient of the number of grooves in the numerator and a product of the number of strands and the number of parallel branches in the numerator. In an advantageous manner, the number of parallel branches is selected to be 1. In this case, the simplest possible interconnection of the winding is produced.

According to one embodiment, the stator sheets of the laminated stator core are formed in each case identically having recesses provided for forming the stator grooves. The helical course of the stator grooves is provided by stacking the stator sheets in a manner rotated with respect to one another. In this manner, the laminated stator core can be manufactured in a very economical way because the same punching die can be used for all stator sheets which are arranged in parallel or are stacked. Accordingly, two adjacent stator sheets are rotated slightly with respect to one another by a predetermined angle about the centre axis so that the recesses are arranged in an overlap with respect to one another, which corresponds to the helical line course.

According to one advantageous embodiment, the laminated stator core contains an inner partial package having radially inner stator grooves and an outer partial package having radially outer stator grooves. The stator sheets of the inner partial package are each produced having an identical geometry and the stator sheets of the outer partial package are each produced having an identical geometry. The stator sheets of the inner partial package and the stator sheets of the outer partial package are stacked in a manner rotated in opposite directions with respect to one another. In this manner, the opposite helical lines of the stator grooves can be produced with little manufacturing outlay. Nevertheless, a very economical manufacturing method is still permitted because the same punching die can be used for all parallel or stacked stator sheets of the inner partial package and the same punching die can be used for all parallel or stacked stator sheets of the outer partial package. Accordingly, two adjacent stator laminations of the inner partial package rotated slightly with respect to one another in a first direction by a predetermined angle about the centre axis and two adjacent stator sheets of the outer partial package are rotated slightly with respect to one another in a second opposite direction by a predetermined angle about the centre axis. In this manner, the recesses of the stator sheets of the inner partial package and the recesses of the stator sheets of the outer partial package are arranged in an opposed overlap with respect to one another, which corresponds to the opposed helical line course.

According to a further embodiment, the stator sheets are formed in each case differently having recesses provided for forming the stator grooves. The helical course of the stator grooves is provided by means of different distances of the recesses in the individual stator sheets. In this respect, an individually matching stator sheet shape is produced in this case for each position of a stator sheet within the stack, wherein the individual geometries can also be repeated within the stack. In this case, the production can be implemented e.g. by means of a beam cutting process, in particular a laser beam cutting process, which is more flexible in terms of shape compared to a punching process. Also feasible would be flexible punching dies having a variable geometry or, in the case of very large quantities, of course a plurality of individual punching dies for each of the different stator sheet shapes.

According to one development, the recesses for radially inner and radially outer stator grooves are each integrally formed in a common stator sheet, wherein the oppositely helical course of the radially inner and radially outer stator grooves is provided by a continuous displacement of the inner and outer stator grooves with respect to one another from stator sheet to stator sheet. In this case, an individually matching stator sheet shape is also produced for each position of a stator sheet within the stack, wherein the individual geometries can also be repeated within the stack. In particular flexible separating processes, such as e.g. laser beam cutting, are also used in this case for production purposes. The one-piece production of the inner and outer recesses which is thus possible advantageously reduces the number of parts.

According to one embodiment, the stator sheets have straight, in particular punched, edges. A width of the recesses provided for the stator grooves is larger than the width of the conductor bars by an amount which is predetermined by the pitch of the helical shape of the course of the stator grooves and by the sheet thickness of the stator sheets. A clear width or continuous width of the stator grooves which is reduced by reason of the offset between the recesses of the stator sheets thus corresponds substantially to the width of a conductor bar. In practice, the continuous clear width of the stator groove is provided slightly larger than the width of the conductor bar in order to provide a clearance fit necessary for introducing the conductor bars. The edge of a stator groove thus describes a staircase shape with the respective sheet thickness as steps, on which the conductor bar is uniformly supported. In this manner, torque support is made possible uniformly over the entire thickness of the laminated stator core or over the entire length of the conductor bars accommodated in the laminated stator core.

According to one embodiment, an angle swept in each case by the stator grooves is smaller than an angle swept in each case by the conductor bars. The swept angle relates in each case to a rotation about the centre axis of the stator. The difference in the swept angles arises by reason of the fact that the conductor bars protrude axially beyond the stator core and are thus longer than the stator grooves. Since the helical course likewise continues, a larger angle swept thereby is produced. The stated different is provided so as to ensure sufficient accessibility of the winding ends for connecting, in particular welding, the conductor bar ends after introduction into the stator grooves. Furthermore, this enables the winding to engage with the support device or the support element thereof in a manner axially offset with respect to the stator core.

From the quotient of the swept angles, i.e. a ratio of the angle swept by each of the stator grooves to the angle swept by each of the conductor bars, a so-called pole coverage degree can be defined for the laminated stator core.

According to one embodiment, a ratio of the angle swept by each of the stator grooves to the angle swept by each of the conductor bars is in a range between 0.6 and 0.8, in particular between 0.6 and 0.75, preferably between 0.6 and 0.7. This ratio (pole coverage degree) provides in this range an optimum between losses, produced by current heat, and torque utilisation.

According to one embodiment, the support device has a support element, in which support grooves are provided which correspond to the helical arrangement of the conductor bars and are in engagement with the conductor bars. In this manner, form-fitting embedding of the conductor bars into the support element is provided for the support of the torque at the axial end. Preferably, there is engagement with all conductor bars so that torque support is homogeneously or uniformly transferred over the entire bar system of the winding.

In order to transmit the torque, the support element can be coupled to a mechanically fixed base of a radial flux double-rotor machine. For this purpose, one possible embodiment provides through-bores for force-fitting fastening means, such as screws, but of course form-fitting connection means or an integrally bonded connection would also be feasible.

According to one embodiment, the support grooves follow, at least in sections, the helical course of the twisted conductor bars. In particular, the support grooves have a similarly twisted course like the conductor bars. For example, the support element is substantially annular and has recesses on the inner and/or outer periphery which are oriented radially and correspond to the course of the conductor bars.

According to one embodiment, the support device has a radially inner support element for engagement with the radially inner layer of the conductor bars, and has a radially outer support element for engagement with the radially outer layer of the conductor bars. In this embodiment, the support elements can be annular, wherein the inner support element has, on its outer periphery, grooves or teeth corresponding to the course of the inner layer of the conductor bars for receiving the radially inner conductor bars in a form-fitting manner, and the outer support element has, on its inner periphery, grooves or teeth corresponding to the course of the outer layer of the conductor bars for receiving the radially outer conductor bars in a form-fitting manner. The grooves or teeth follow in particular the respective helical course. By reason of the arrangement on the inner or outer periphery, the recessed grooves are easily accessible for mechanical processing, which simplifies the production of the support elements.

According to one embodiment of a radial flux double-rotor machine, the support elements are fixed to the base and thus guide the torque to the fixed part of the electric machine. For this purpose, the support elements can be fastened individually with the base, e.g. a housing, of the machine. Alternatively or in addition, the inner and outer support elements can be fastened together.

According to one embodiment of a stator, the support device contains a heat-conducting material, in particular a metal, for example an aluminium alloy. In particular, both support elements can contain such a material. This permits not only a high mechanical strength but also heat dissipation from the winding via the support device.

According to one embodiment of a corresponding radial flux double-rotor machine having a support device which contains a heat-conducting material, the base additionally has a heat sink which is designed to absorb heat dissipated via the support device from the stator, in particular from the winding. As a result, the support device has a high mechanical strength and at the same time ensures a good thermal connection of the winding to the heat sink. For example, the housing of the machine can serve as the heat sink. Alternatively or in addition, the support device, for example the inner and outer support elements, can be in thermal contact with an actively cooled heat sink of the machine. In this manner, the current heat losses produced in the winding or in the conductor bars can be effectively dissipated.

According to one embodiment of a radial flux double-rotor machine, a predetermined number of pole pairs are provided both on the first rotor and on the second rotor. An angle swept by each of the conductor bars is designed to form a conductor loop for each pole of the rotors. The swept angle to be provided can thus be calculated from the quotient of a whole revolution ($2\pi$ or 360°) and twice the number of pole pairs p.

The above embodiments and developments can be combined with each other in any manner if it is useful to do so. Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the present invention.

CONTENT OF THE DRAWING

The present invention will be explained in more detail hereinafter with the aid of the exemplified embodiments shown in the schematic figures of the drawings. In the drawing.

Figure 1:
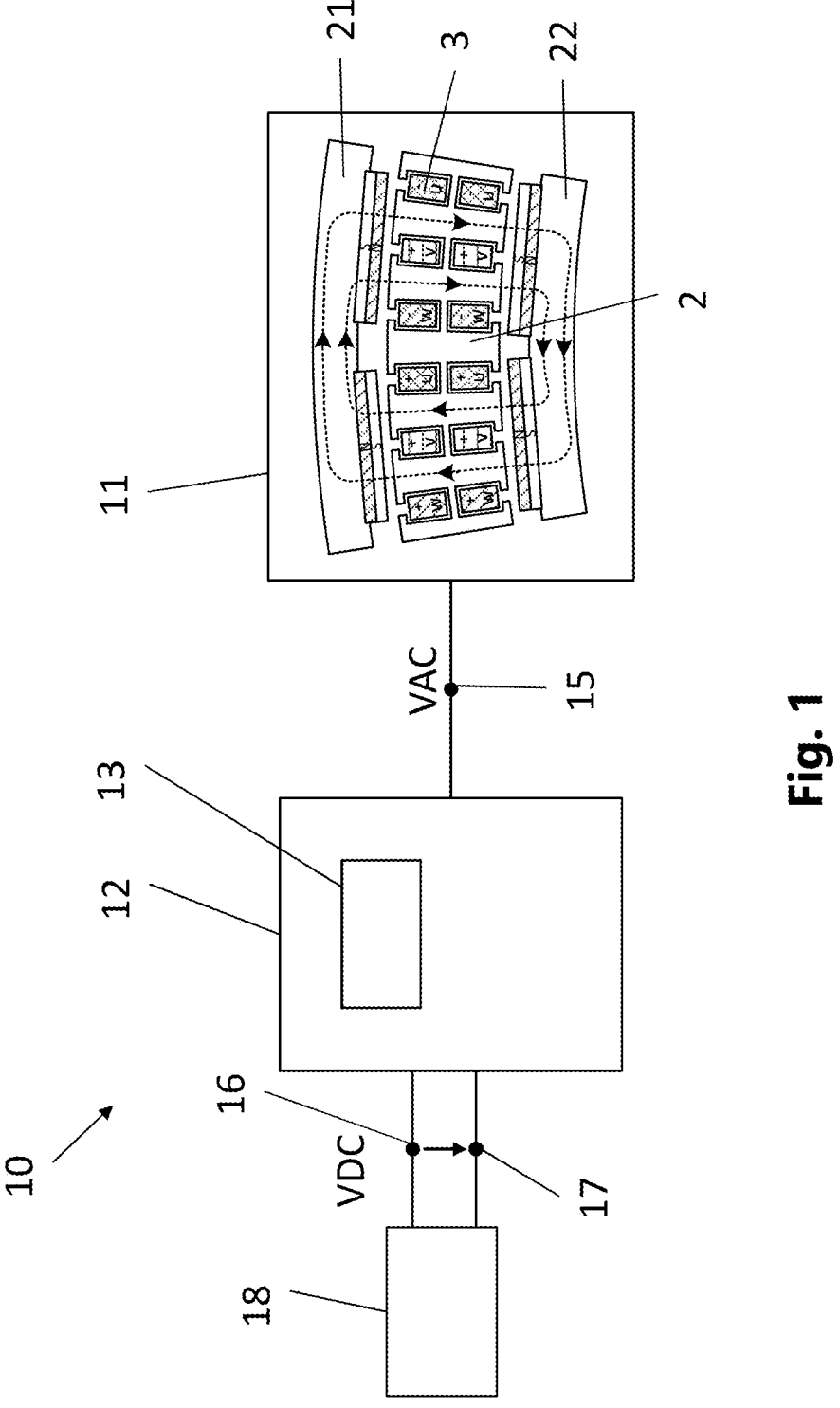
FIG. 1 shows a block diagram of an electric drive system in accordance with the invention.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures of the drawing, like and functionally identical elements, features and components and elements, features and components acting in an identical manner are provided with the same reference signs, unless indicated otherwise.

DESCRIPTION OF EXEMPLIFIED EMBODIMENTS

FIG. 1 shows a block diagram of an inventive electric drive system 10 for a motor vehicle.

The electric drive system designated by the reference sign 10 is provided for example—but not necessarily—for use in a motor vehicle.

The drive system 10 comprises at least one multiphase electric synchronous machine 11 as well as an inverter circuit 12.

The synchronous machine 11 is illustrated in the block diagram symbolised by a portion of a cross-sectional diagram. It is connected on the input side to the inverter circuit 12 which drives the machine 11.

The synchronous machine 11 is designed as a double-rotor machine and accordingly has a double-rotor comprising two rotors 21, 22. Furthermore, a stator is provided having a stator core (2) and a distributed winding (3) which is placed in the stator core (2) and is designed in a self-supporting manner for torque support.

The double-rotor is, or the rotors 21, 22 are, constructed from flux-carrying material consisting of solid material.

In accordance with the invention, the inverter circuit 12 is designed as a three-level or multi-level inverter circuit 12. The inverter circuit 12 has at least one inverter 13.

The inverter 13 is coupled to the electric machine 11 via its load output 15 and is coupled to a supply voltage source 18 via supply connections 16, 17. The inverter 13 is designed to convert a direct voltage VDC received on the supply side into an alternating voltage VAC. The inverter 13 is designed as a multiphase inverter 13, wherein the number of phases of the inverter 13 typically corresponds to the number of phases of the electric machine 11. The electric machine 11 is driven via the phase currents provided by the inverter 13 at the load output 15.

For example, the synchronous machine is a yokeless double-rotor machine. The torsionally stiff winding is designed as a distributed winding and has a correspondingly small upper field spectrum. By reason of this embodiment, the rotors can be manufactured from solid material because only small upper fields and resulting eddy currents are generated in the rotor by the winding.

The three-level or multi-level inverter circuit 12 can be used to reduce induced current harmonics which would produce, with a typical two-level inverter, eddy currents and additional losses in the rotors consisting of solid material. Through the operation of the three-level or multi-level inverter circuit 12, the causal harmonics in the input voltage can be significantly reduced, which leads to a reduction in losses by more than 75%.

Figure 2:
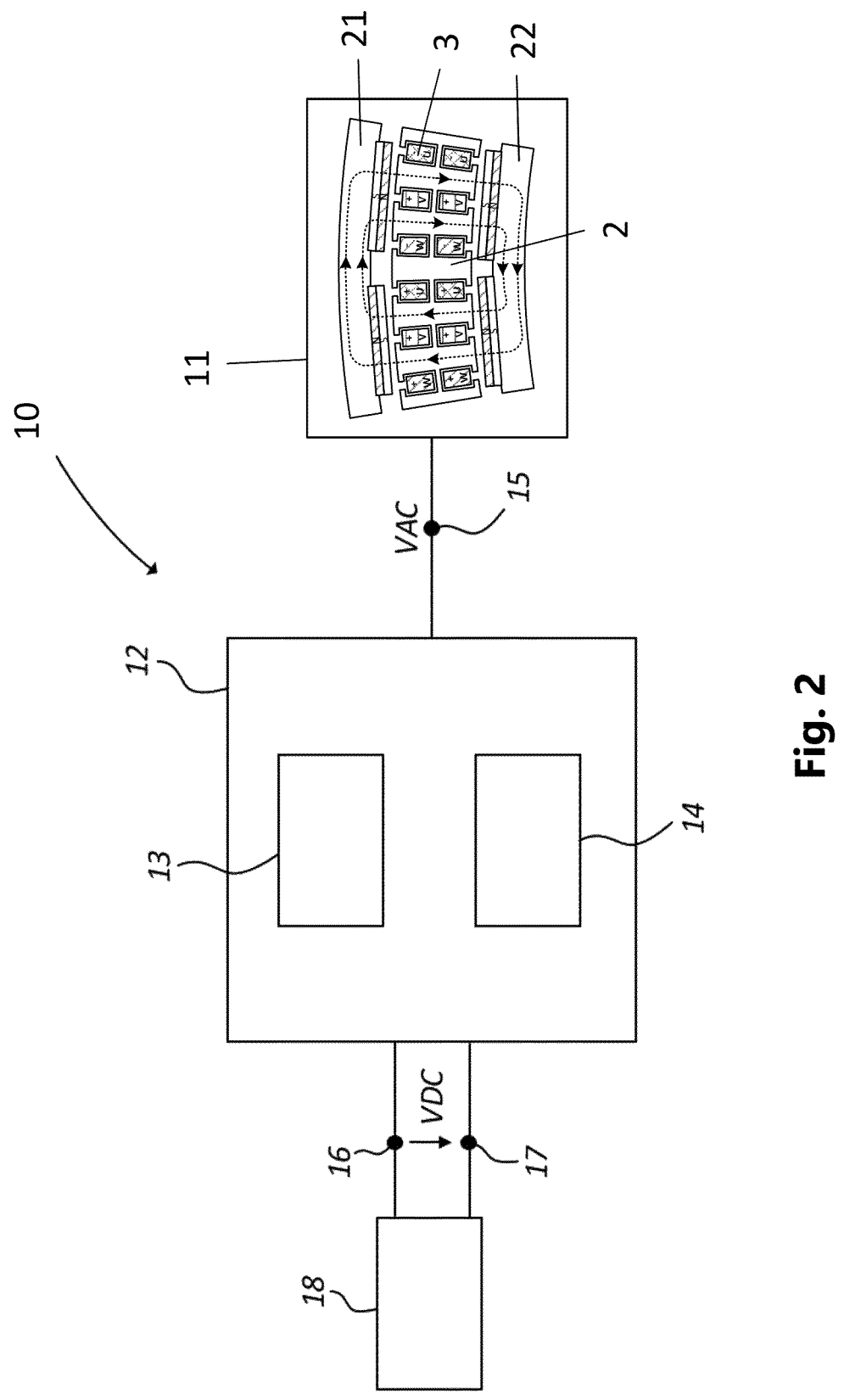
FIG. 2 shows a block diagram of an electric drive system according to one embodiment.

FIG. 2 shows a block diagram of an electric drive system 10 according to one embodiment.

In the embodiment illustrated here, the operating mode of the inverter circuit 12 can be set via an operating mode setting device 14 which is coupled on the input side, inter alia, to the electric machine 11. In particular, the operating mode setting device 14 can be used to set whether the inverter 13 operates in two-level operation, in three-level or multi-level operation or in mixed operation. Mixed operation refers to an operating mode, in which the inverter is operated both in two-level operation and three-level or multi-level operation, as can occur e.g. in the event of a transition from one operating mode to the next. The structure and mode of operation of the operating mode setting device 14 will be explained in detail hereinafter with reference to the following FIGS. 4 to 6.

The electric machine 11 is a synchronous machine 11, for example but not necessarily a three-phase synchronous machine 11. In this case, the inverter circuit 12 for example has a three-phase inverter 13.

It is likewise possible if the electric machine 11 of the electric drive system 10 is a wheel hub motor for an electrically operable motor vehicle. However, other applications are also feasible and advantageous.

Figure 3:
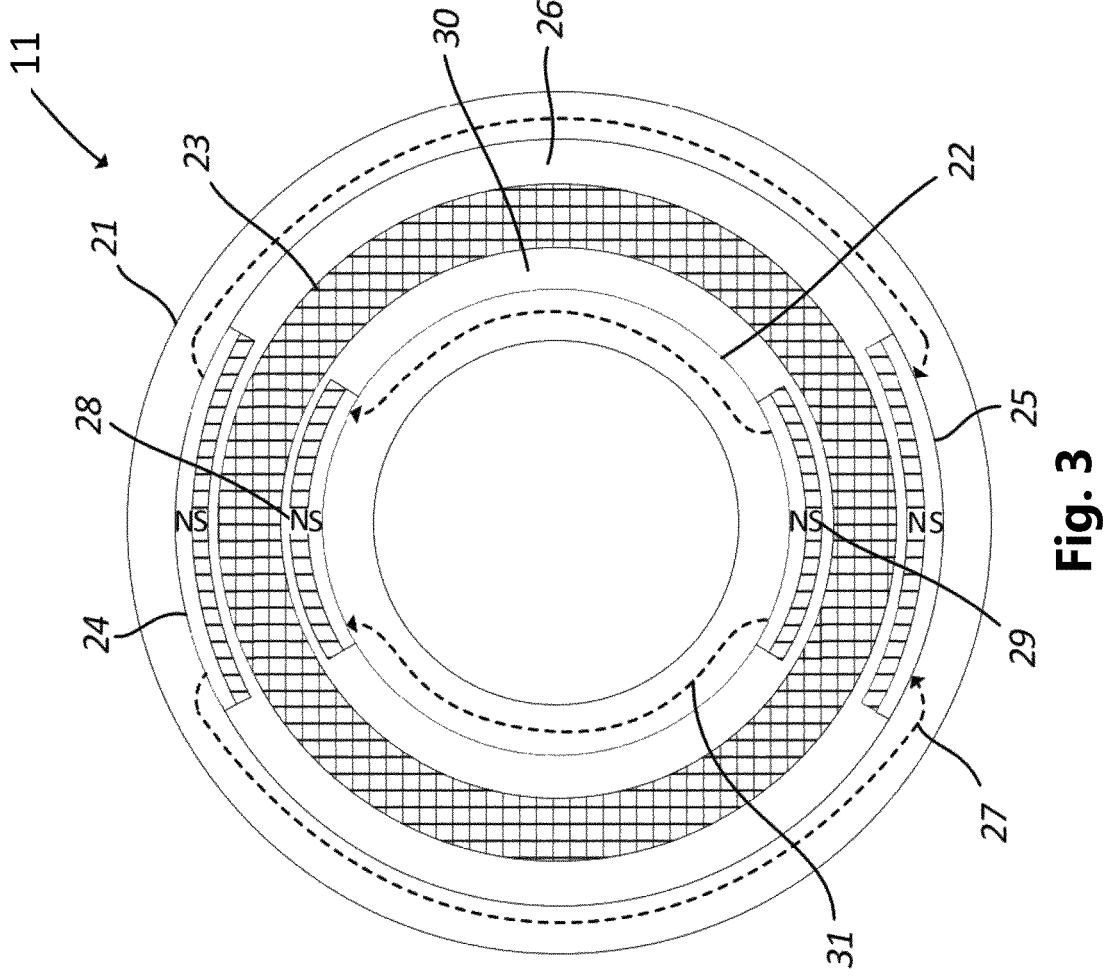
FIG. 3 shows a schematic cross-sectional view of one example of an electric machine of the electric drive system in accordance with the invention as shown in FIG. 1.

FIG. 3 shows a schematic cross-sectional view of one example of a synchronous machine 11 of the electric drive system in accordance with the invention as shown in FIG. 1.

One aspect essential to the invention is the circumstance that the synchronous machine or the electric machine 11 is equipped with a double rotor 20 and that, furthermore, the double rotor is constructed from flux-carrying material consisting of solid material. The cross-section of the double-rotor synchronous machine 11 is illustrated in FIG. 3. The double-rotor machine 20 comprises the outer rotor 21 and the inner rotor 22. The stator 23 is arranged between the two rotors 21, 22 in a manner known per se. The stator 23 can be for example, but not necessarily, a yokeless stator 23.

The outer rotor 21 and inner rotor 22 are for example not laminated but instead are constructed from solid material. The inner rotor 22 is tubular. However, it would also be feasible for the inner rotor 22 to have a solid, full-volume configuration.

In the example shown, two magnets 24, 25 with opposite poles are placed between the outer rotor 21 and the stator 23 on the inner surface of the outer rotor 21 in the outer air gap 26. However, it would be feasible and advantageous if the magnets 24, 25 are embedded in pocket-shaped recesses of the outer rotor 21 which are provided specifically for this purpose. However, it would also be feasible if the magnets 24, 25 are spaced apart from the outer rotor 21, i.e. not directly mounted on the inner surface thereof. The flux lines 27 between the north pole and south pole of the magnets 24, 25 with opposite poles extend in this case in the core material of the outer rotor 21.

In the example shown, two magnets 28, 29 with opposite poles are likewise placed between the inner rotor 22 and the stator 23 on the inner surface of the inner rotor 22 in the inner air gap 30. In this case, the magnets 28, 29 can also be embedded into corresponding pockets of the inner rotor 22 or can be spaced apart from the inner rotor 22. The flux lines 31 between the north pole and south pole of the magnets 28, 29 with opposite poles extend in this case in the core material of the inner rotor 22.

The flux-carrying material in the outer and/or inner rotor 21, 22 consists for example of solid iron or a corresponding solid iron alloy.

Figure 4:
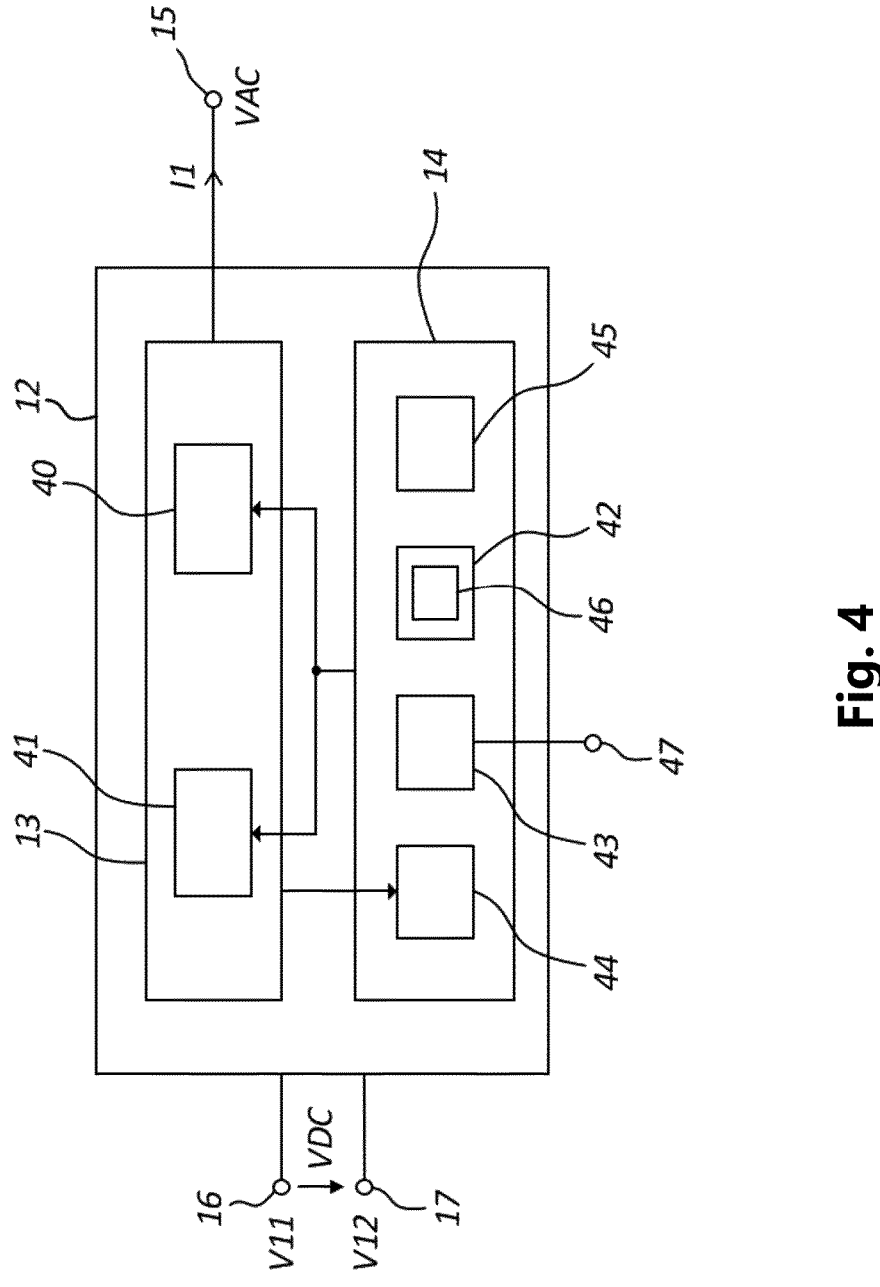
FIG. 4 shows a block diagram of a three-level or multi-level inverter circuit for an electric drive system in accordance with the invention corresponding to FIG. 1.

FIG. 4 shows a block diagram of a three-level or multi-level inverter circuit for an electric drive system corresponding to FIG. 2.

The inverter circuit 12 comprises—as already explained with reference to FIG. 2—two supply connections 16, 17, a load output 15, a three-level or multi-level inverter 13 as well as an operating mode setting device 14.

A first supply potential V11, e.g. a positive supply potential, can be tapped at the first supply connection 16. A second supply potential V12, e.g. a negative supply potential or a reference potential, can be tapped at the second supply connection 17. Therefore, a supply direct voltage VDC=V11−V12 is provided between the supply connections 16, 17.

At the load output 15, a multi-phase load current I1 can be tapped, via which the various phases of the electric machine 11, which can be connected via the load output 15, are operated.

The controllable three-level or multi-level inverter 13 is arranged between the supply connections 16, 17 and the load output 15. The inverter 13 is designed to convert a direct voltage VDC received on the supply side into an alternating voltage VAC, in order to provide the multiphase load current I1 at the load output.

The inverter 13 has a first driver level 40 and at least one second driver level 41. The second driver level 41 is designed to carry output load currents to the load output 15 which are smaller than the output load currents provided by the first driver level 40.

The operating mode setting device 14 serves the purpose of setting and therefore controlling the operating mode of the inverter 13 and thus of the entire inverter circuit 12. In particular, the inverter 13 is designed to operate the inverter 13 either in a first operating mode in three-level or multi-level operation or in a second operating mode in two-level operation. It would also be feasible to have a third operating mode which includes a mixed form of two-level operation and three-level or multi-level operation. The third operating mode would be feasible and expedient in particular in the event of a transition from the first operating mode to the second operating mode and vice versa.

The operating mode setting device 14 controls the used operating mode of the inverter 13 depending upon the overall efficiency of the entire electric drive system 10. The overall efficiency is a function of the detected phase current of the electric machine 11 as well as at least one further parameter and/or property of the electric machine 11 influencing the overall efficiency.

For the purpose of setting the operating mode used in each case, the operating mode setting device 14 comprises at least one of the following devices:
an evaluation device 42;
a first measuring device 43;
a second measuring device 44;
a control device 45.

The evaluation device 42 is designed to optimise the overall efficiency of the electric drive system 10 on the basis of the phase current and of the at least one further parameter and/or property. This can be effected e.g. in situ, i.e. during the operation of the electric drive system 10. Preferably, however, the relatively computationally intensive calculation is carried out in advance, e.g. by means of suitable calculation (e.g. numerical or analytical) and/or using a specified family of characteristics. For example, the numerical efficiency calculation for 2 L operation and 3 L operation as well as the mapping of the function with decision output is effected in advance, i.e. offline. The selection of the better efficiency with the aid of the switching and the use of the lookup table for determining the efficiency can be performed also—but not exclusively—more or less dynamically during the operation.

For the purpose of optimisation, the evaluation device 42 has an optimisation module 46. The optimisation module 46 initially calculates the overall efficiency. Subsequently, the overall efficiency is optimised analytically or via a lookup table, e.g. via an optimisation function, taking into consideration the phase current as well as the at least one further parameter and/or property.

Furthermore, the operating mode setting device 14 also comprises first and/or second measuring devices 43, 44. The first measuring device 43 has e.g. at least one sensor input 47. In this regard, the operating mode setting device 14 can be coupled to the electric machine 11 via the sensor inputs 47 in order to record and detect electrical or physical parameters of the electric machine 11, such as for instance the phase current, the temperature and/or the rotor speed of the electrical machine 11. The second measuring device 44 is arranged in order to detect e.g. the temperature and/or the intermediate circuit voltage of the inverter 13. Furthermore, the supply voltage VDC can also be detected via the second measuring device 44.

The actual control of the inverter is effected via a control device 45 provided specifically for this purpose. The control device 45 sets the respective operating mode of the inverter 13, i.e. whether the inverter 13 is operated in three-level or multi-level operation or in two-level operation. The control device 45 can control e.g. the inverter 13 such that during three-level or multi-level operation both driver levels 40, 41 are activated and during two-level operation the second driver level 40 is deactivated.

Figure 5:
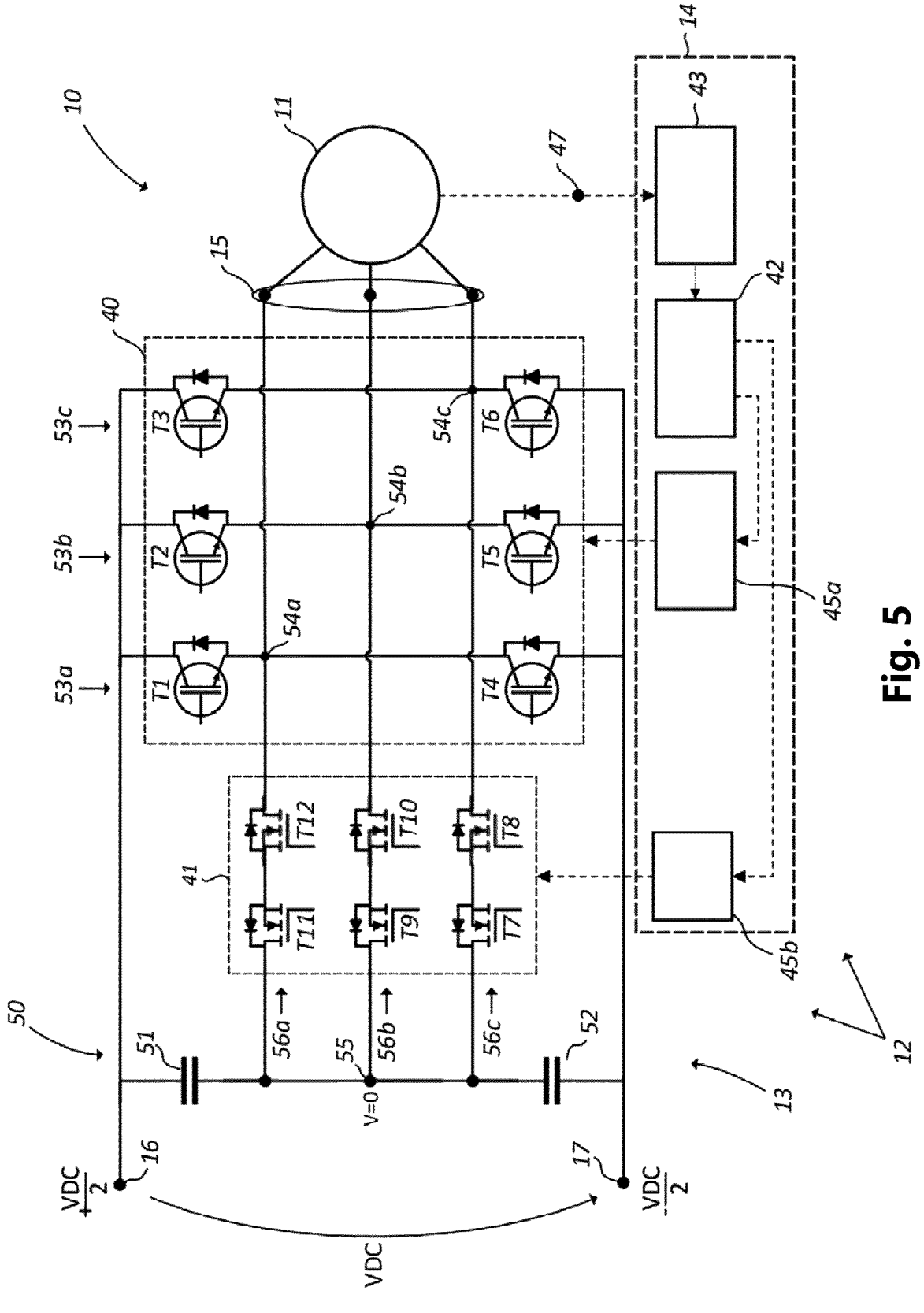
FIG. 5 shows a circuit diagram of an exemplified embodiment of an inverter circuit in accordance with the invention.

FIG. 5 shows a circuit diagram of an exemplified embodiment of an inverter circuit in accordance with the invention.

The supply direct voltage VDC is provided at the supply connections 16, 17, wherein the supply potential V11=VDC/2 can be tapped at the first supply connection 16 and the supply potential V12=−VDC/2 can be tapped at the second supply connection 17. It would also be feasible to have a configuration, in which a reference potential, e.g. the potential of the reference ground GND, is provided at the second supply connection 17. In this case, it would be possible to tap the supply potential V11=VDC at the first supply connection 16.

An intermediate circuit 50 consisting of a series connection of two intermediate circuit capacitors 51, 52 is connected on the input side of the inverter 13. The intermediate circuit 50 functions as an energy storage device.

The inverter 13 illustrated in FIG. 5 includes a t-type neutral point clamped inverter architecture.

For this purpose, the first, outer driver level has, in the case of a 3-phase inverter shown, three half-bridge circuits 53a-53c which, in relation to the load paths thereof, are each likewise connected on the load side between the supply connections 16, 17. The respective centre taps 54a-54c of the half-bridge circuits 53a-53c each form an output load connection 15a-15c of the inverter 13. Each of the half-bridge circuits 53a-53c has in each case a first controllable power switch T1, T2, T3 which are designed as high-side switches. These first power switches T1, T2, T3 are connected to the first supply connection 16. The first power switches T1, T2, T3 are designed to provide a first voltage level at the load output 15. Furthermore, each of the half-bridge circuits 53a-53c has in each case a second controllable power switch T4, T5, T6 which are designed as low-side switches. These second power switches T4, T5, T6 are connected to the second supply connection 17. The second power switches T4, T5, T6 are designed to provide a second voltage level at the load output 15.

The second, inner driver level 41 is connected between the centre tap 55 of the intermediate circuit and the output load connections 15a-15c—and thus the respective centre taps 54a-54c of the half-bridge circuits 53a-53c. In the example shown, the second driver level 41 comprises in each case three circuit branches 56a-56c. Each of the circuit branches 56a-56c comprises a series circuit of two controllable power switches T7/T8; T9/T10; T11/T12 which are arranged anti-parallel in relation to the load paths thereof. The controllable power switches T7/T8; T9/T10; T11/T12 are designed to provide a third voltage level at the load output 15a-15c, said third voltage level being between the first and the second voltage level.

In order to activate the respective controllable power switches, the control device 45 has a first control unit 45a and a second control unit 45b. The first control unit 45a is designed to activate the power switches T1-T6 of the first driver level 40. The second control unit 45b is designed to activate the power switches T7-T12 of the second driver level 41.

In the exemplified embodiment in FIG. 5, the inverter 13 has a hybrid design. In this case, the power switches of the inverter 13 are not produced with the same semiconductor technology and/or are not of the same switch type. In particular, in the example shown the power switches T1-T6 are designed as Si-IGBTs having Si free-wheeling diodes. The power switches T7-T12 are designed as SiC-MOSFETs.

Alternatively (not shown in FIG. 5), the power switches T7-T12 can be designed as SiC-MOSFETs and the power switches T1-T6 can be designed as GaN-MOSFETs.

Alternatively (likewise not shown in FIG. 5), the power switches T7-T12 can be designed as IGBTs having a free-wheeling diode and the power switches T1-T6 can be designed as GaN power switches, in particular as GaN-MOSFETs.

Alternatively (likewise not shown in FIG. 5), in so-called homogeneous inverter topology all power switches T1-T12 of the inverter 13 can be of the same switch type and/or can be produced with the same semiconductor technology, e.g. designed as GaN power switches, SiC power switches, such as for instance SiC-MOSFETs.

Figure 6:
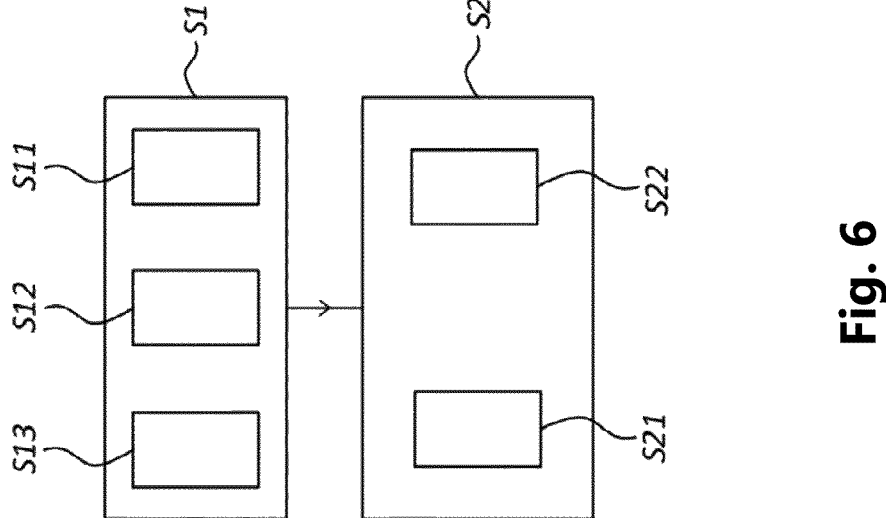
FIG. 6 shows a flow diagram of a method in accordance with the invention for operating an electric drive system.

FIG. 6 shows a flow diagram of a method in accordance with the invention for operating an electric drive system. The electric drive system which can be e.g. a drive system corresponding to FIG. 2 has a synchronous machine equipped with a double rotor. The double-rotor is constructed from flux-carrying material consisting of solid material.

In a first step S1, the overall efficiency of the electric drive system is determined, e.g. offline. For this purpose, the phase current of the electric machine of the electric drive system is initially detected (S11). In addition, at least one further parameter (S12), influencing the overall efficiency, and/or at least one further property (S13), influencing the overall efficiency, of the electric machine is determined.

From all of this information, in a next step S2 the synchronous machine is operated. For this purpose, a controllable three-level or multi-level inverter circuit is used. The controllable three-level or multi-level inverter of the inverter circuit is operated in dependence upon the overall efficiency of the electric drive system and the parameters and properties influencing the overall efficiency, either both in the three-level or multi-level operating mode S21 or in the two-level operating mode S22.

It would also be feasible to have a mixed form of three-level or multi-level operation and two-level operation. Such a mixed form of operation would be feasible and advantageous e.g. during a transition from three-level or multi-level operation to two-level operation in order to avoid e.g. hard switching. The latter could be associated with losses and therefore efficiency losses.

Figure 7:
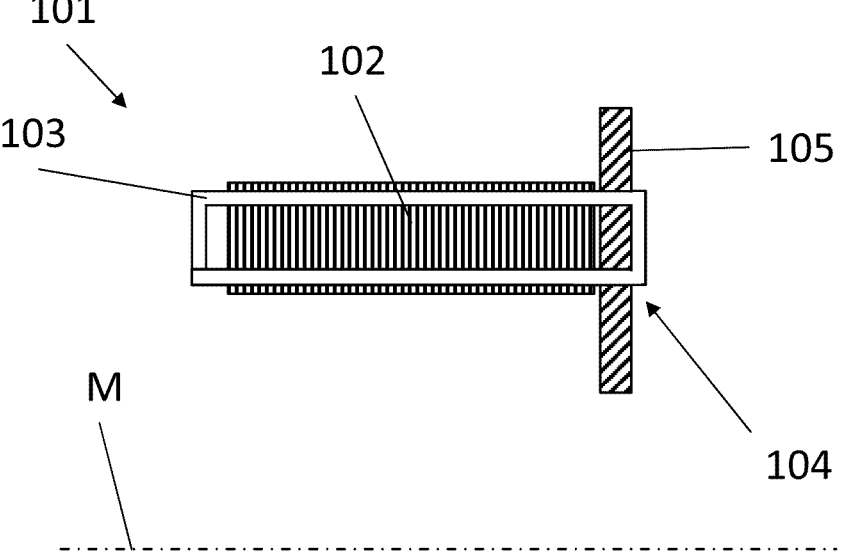
FIG. 7 shows a schematic longitudinal sectional view of a stator.

FIG. 7 shows a schematic longitudinal sectional view of a stator 101.

This is a schematic diagram of a stator 101 for a synchronous machine 110 designed as a radial flux double-rotor machine according to a further embodiment (see in this respect FIG. 8), in particular for a wheel hub motor. The stator has a stator core 102, a winding 103 and a support device 105. The stator core 102, the winding 103 and the support device 105 are designed to be rotationally symmetrical about the indicated centre axis M.

The winding 103 is self-supporting for torque support of the stator and protrudes beyond the stator core 102 at at least one axial end 104. The support device 105 is arranged axially offset with respect to the stator core 102 and is form-fittingly connected to the winding 103 at at least one axial end 104 for torque support. In this manner, a torque present at the stator core 102 during the operation of a radial flux double-rotor machine 110 can be supported by means of the self-supporting winding 103 on the support device 105.

The winding 103 contains a conductor material having a low electrical resistance, for example copper. The stator core 102 is constructed for example from a soft-magnetic material for magnetic flux carrying. The support device contains for example a heat-conducting material, e.g. an aluminium alloy. Of course, the winding 103 is electrically isolated.

Figure 8:
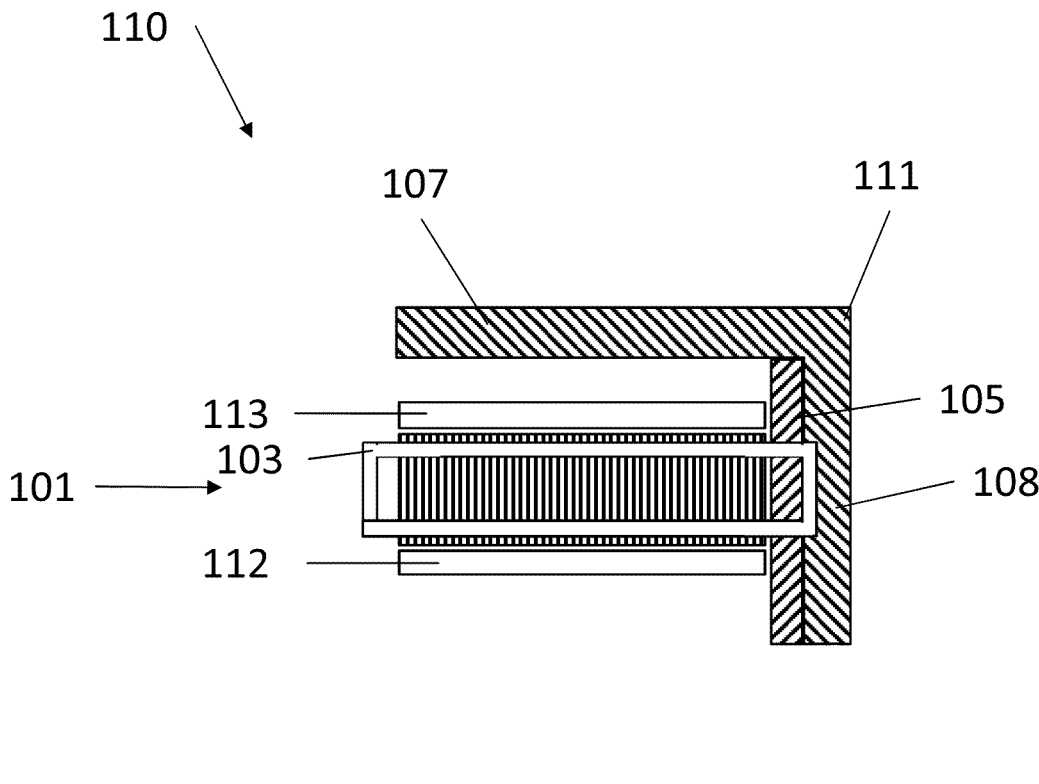
FIG. 8 shows a schematic longitudinal sectional view of a radial flux double-rotor machine.

FIG. 8 shows a schematic longitudinal sectional view of a radial flux double-rotor machine.

This is also a purely illustrative schematic diagram. Accordingly, the synchronous machine 110 designed as a radial flux double-rotor machine has, in addition to the stator 101 shown in FIG. 7, a mechanically fixed base 111, a first rotor 112 and a second rotor 113. The stator core 102, the winding 103, the support device 105, the base 111, the first rotor 112 and the second rotor 113 are likewise designed to be rotationally symmetrical about the indicated centre axis M.

The winding 103 is self-supporting for torque support of the stator 101 and protrudes beyond the stator core 102 at at least one axial end 104 and is supported on the base 111 via the support device 105. The support device 105 is arranged axially offset with respect to the stator core 102 and is form-fittingly connected to the winding 103 at at least one axial end 104 for torque support. Again, the support device 105 is fastened to the base so that the torque can be supported via the support device 105 on the base 111.

The first rotor 112 is arranged radially within the stator core 102 and the second rotor 113 is arranged radially outside the stator core 102. The base 111 can be designed e.g. as a housing of the machine and in this case comprises in a purely illustrative manner an L-shaped structure which is illustrated having two limbs 107, 108. The illustration is not to be understood as exhaustive, on the contrary the base can have further components and/or structural portions. The first limb 107 extends substantially radially, the second limb 107 extends substantially axially with the greatest distance with respect to the centre axis M.

Purely schematically, the support device 105 is illustrated in one part extending in a radial manner, but it can also be provided in multiple parts and/or with another geometry configured for form-fitting connection to the winding 103. The illustrated overlap of the winding 103 with the base 111 is purely due to the illustrative schematic illustration and does not signify a direct connection. The winding 103 is for example connected via the support element 105 to the base 111 for torque support.

The radial flux double-rotor machine 110 shown in FIG. 8 can be used as a synchronous machine 11 in an electric drive system 10 according to one of FIG. 1 or 2 and in conjunction with an inverter circuit 12 according to one of FIGS. 4 to 6.

Figure 9:
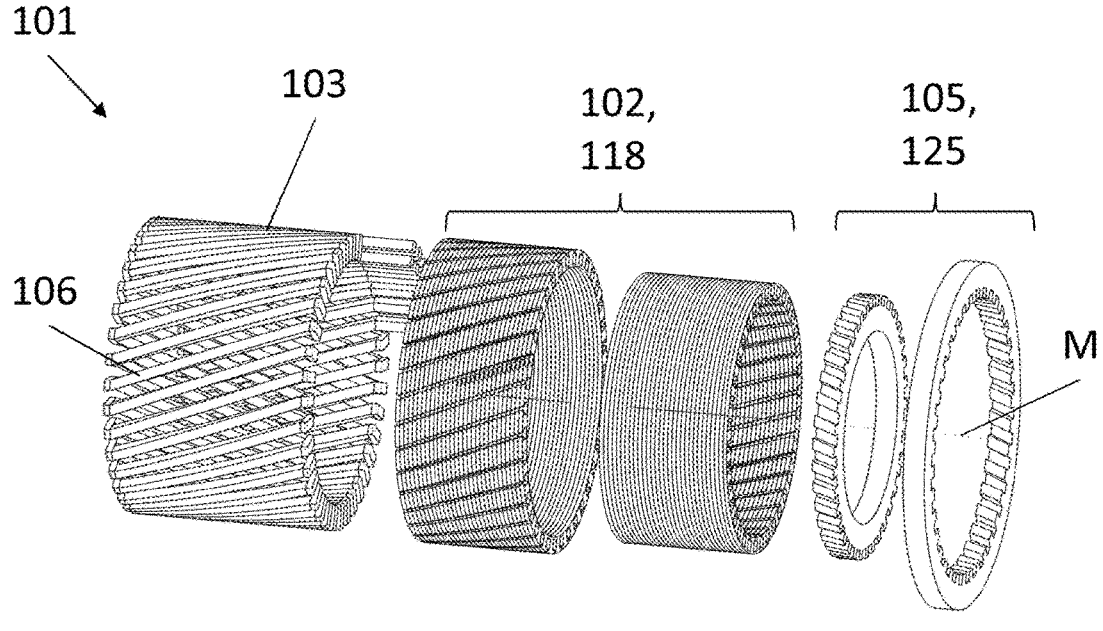
FIG. 9 shows an exploded view of a stator according to one embodiment.

FIG. 9 shows an exploded view of a stator 101 according to a further embodiment.

The stator 101 has a winding 103, a stator core 102 and a support device 105, wherein, in this case, an advantageous exemplary design of these components is illustrated more precisely in perspective.

The winding 103 is constructed from an inner and outer layer having a plurality of conductor bars 106 which are connected together in the manner of a bar structure. The conductor bars 106 in the inner and outer layers are arranged opposite one another in a helical manner and are coupled in an integrally bonded manner at the conductor bar ends to a radial conductor piece 117 connecting the inner and outer layer.

The thickness of the inner and outer layer corresponds in each case to the thickness of a conductor bar 106. That is to say that the winding 103 is formed in the manner of a respective conductor bar 106 by means of a single conductor layer which forms the conductor loop and has a comparatively large cross-section.

By reason of the bar structure formed with the conductor bars, the winding is torsionally stiff and is thereby self-supporting for torque support.

Accordingly, the conductor bars 106 form wave-shaped winding strands and can be interconnected by means of corresponding interconnections, which are known to a person skilled in the art and therefore are not described further, such as e.g. a delta connection, star connection or the like, to form a rotational field-generating winding having any number of strands.

In the illustrated embodiment, the stator core 102 and the support device 105 are each constructed from two components, by way of example. In order to assemble the stator 101, the winding 103, the stator core 102 and the support device 105 are arranged nested one inside the other. After assembly, the components are coaxially oriented with one another on the common centre axis M. The support device 105 which, here by way of example, is in two parts is arranged axially offset with respect to the other components and forms the innermost and outermost component of the stator 101. This is an inner ring and an outer ring which are each designed having grooves for form-fitting engagement with the conductor bars.

The stator core 102 which, here by way of example, is in two parts is formed with two laminated stator cores 118, which are rotated with respect to one another in a helical manner, and this will be discussed further in detail with reference to FIG. 14.

In further embodiments, the stator core 102 and the support device 105 can each also be formed in one part or with more than two parts.

Figure 10:
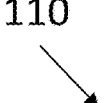
FIG. 10 shows an exploded view of a radial flux double-rotor machine according to one embodiment.
Figure 10:
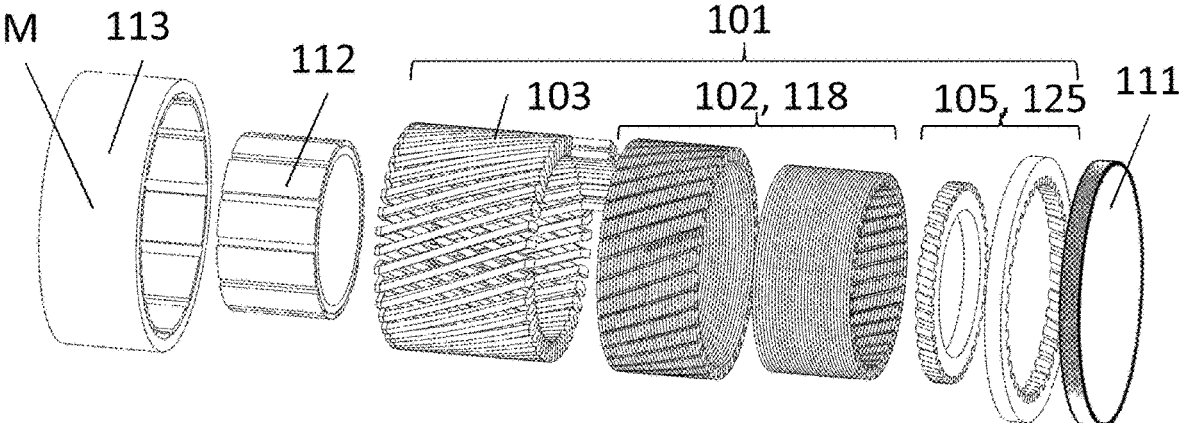

FIG. 10 shows an exploded view of a radial flux double-rotor machine 110 according to one embodiment.

The radial flux double-rotor machine 110 has, in addition to the components of the stator 101, a first rotor 112, second rotor 113 and a base 111. The first rotor 112 is arranged radially within the stator core 102 and the second rotor 112 is arranged radially outside the stator core 102. The rotors 112, 113 are manufactured for example from a soft-magnetic solid material and are fitted, on the respective surface facing the stator core, with permanent magnets, so-called surface magnets, as poles. In further embodiments, it is possible to use other rotors which are known to a person skilled in the art, e.g. with buried magnets, short-circuit rotors or electrically excited rotors.

In this case, the base 111 is illustrated merely schematically for improved clarity. As already described in the description of FIG. 8, the base 111 is fastened in the mounted state to the support device 105. The base 111 is mechanically fixed with respect to a reference system, e.g. a support of a vehicle axle.

The radial flux double-rotor machine 110 shown in FIG. 10 can be used as a synchronous machine 11 in an electric drive system 10 according to one of FIG. 1 or 2 and in conjunction with an inverter circuit 12 according to one of FIGS. 4 to 6.

Figure 11:
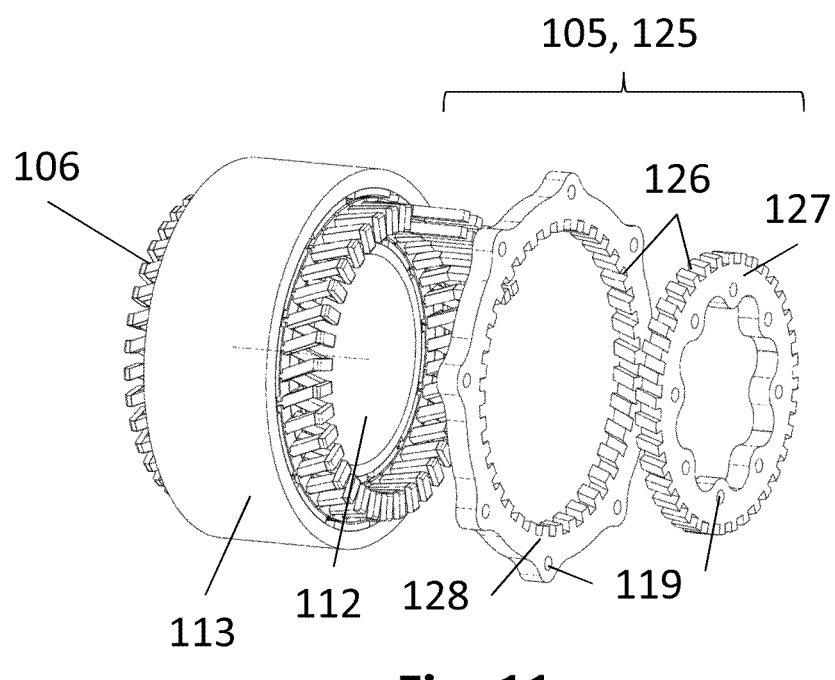
FIG. 11 shows an exploded view of a radial flux double-rotor machine according to a further embodiment.

FIG. 11 shows an exploded view of a radial flux double-rotor machine 110 according to a further embodiment.

In this case, the radial flux double-rotor machine 110 has substantially identical components, as stated in relation to FIGS. 9 and 10. The stator core 102, the winding 103, the first rotor 112 and the second rotor 113 are illustrated in the assembled state on the left-hand side of the figure.

The support device 105 illustrated on the right is likewise formed in two parts and differs in terms of the configuration of the respectively annular inner support element 127 and outer support element 128. The support elements 127, 128 are equipped in this case with support grooves 126. They are provided on the inner periphery of the outer support element 128 and are provided on the outer periphery of the inner support element 127 for engagement with the conductor bars 106 of the winding 103.

To this end, the support grooves 126 are designed to be axially angled corresponding to the helical course of the conductor bars or the pitch thereof, so that they can be brought into engagement with the conductor bars 106 of the winding 103.

The support elements 127, 128 are produced for example from a conductive metal, in a particularly exemplary manner from an aluminium alloy. The two-part design of the support elements 127, 128 renders it possible for the support grooves 126 to be easily accessible for mechanical or machining processing during production.

The inner support element 127 and the outer support element 128 are each provided circumferentially with a plurality of bores 109 for fastening to the base 111. In this case, the bores 109 are arranged by way of example along a hole circle distributed uniformly on the periphery. The individual bores 109 are located slightly outside the main body of the support elements and the support elements 127, 128 thus form a star shape on the periphery facing away from the winding in each case. Of course, other distributions of the bores 109 are feasible, as are other types of fastening means for the connection to the base 111.

Figure 12:
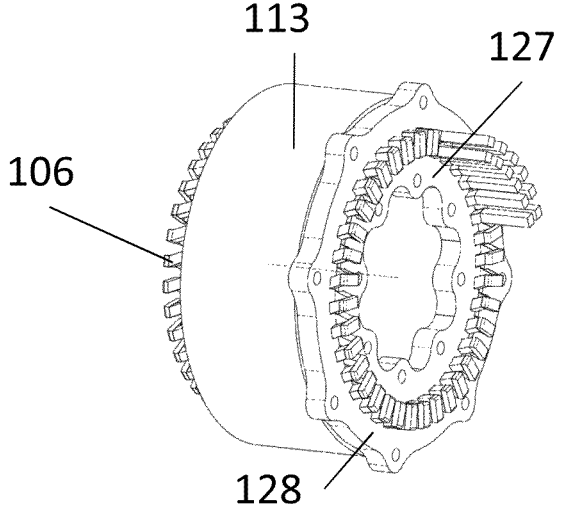
FIG. 12 shows a perspective view of the radial flux double-rotor machine as shown in FIG. 11 in the mounted state.

FIG. 12 shows a perspective view of a radial flux double-rotor machine 110 as shown in FIG. 11 in the mounted state.

The support device 105 is fastened via the bores 109 e.g. in a machine housing (not illustrated) as a base 111 and thus carries the torque to the mechanically fixed part of the radial flux double-rotor machine 110. In this manner, the torque produced by the radial flux double-rotor machine 110 is supported effectively. The fastening of the support device 105 is effected via corresponding fastening means (not illustrated), e.g. screws.

The conductor bars 106 of the winding 103 extend axially on both sides to outside the stator core 102 and the first and second rotor 112, 113. The helically arranged conductor bars 106 of the radially inner and outer layer are connected together in each case outside the stator core 102.

In this case, the support elements 127, 128 are illustrated in engagement with the conductor bars 106 of the winding 103. It can be seen that a conductor bar 106 is placed in each support groove 126 so that all conductor bars are form-fittingly coupled to the support device. Therefore, a torque which is supported via the winding 103 can be supported via the support device 105 on the base 111 which is fastened to the bores 109.

The radial flux double-rotor machine 110 shown in FIGS. 11 and 12 can also be used as a synchronous machine 11 in an electric drive system 10 according to one of FIG. 1 or 2 and in conjunction with an inverter circuit 12 according to one of FIGS. 4 to 6.

Figures 13, 14:
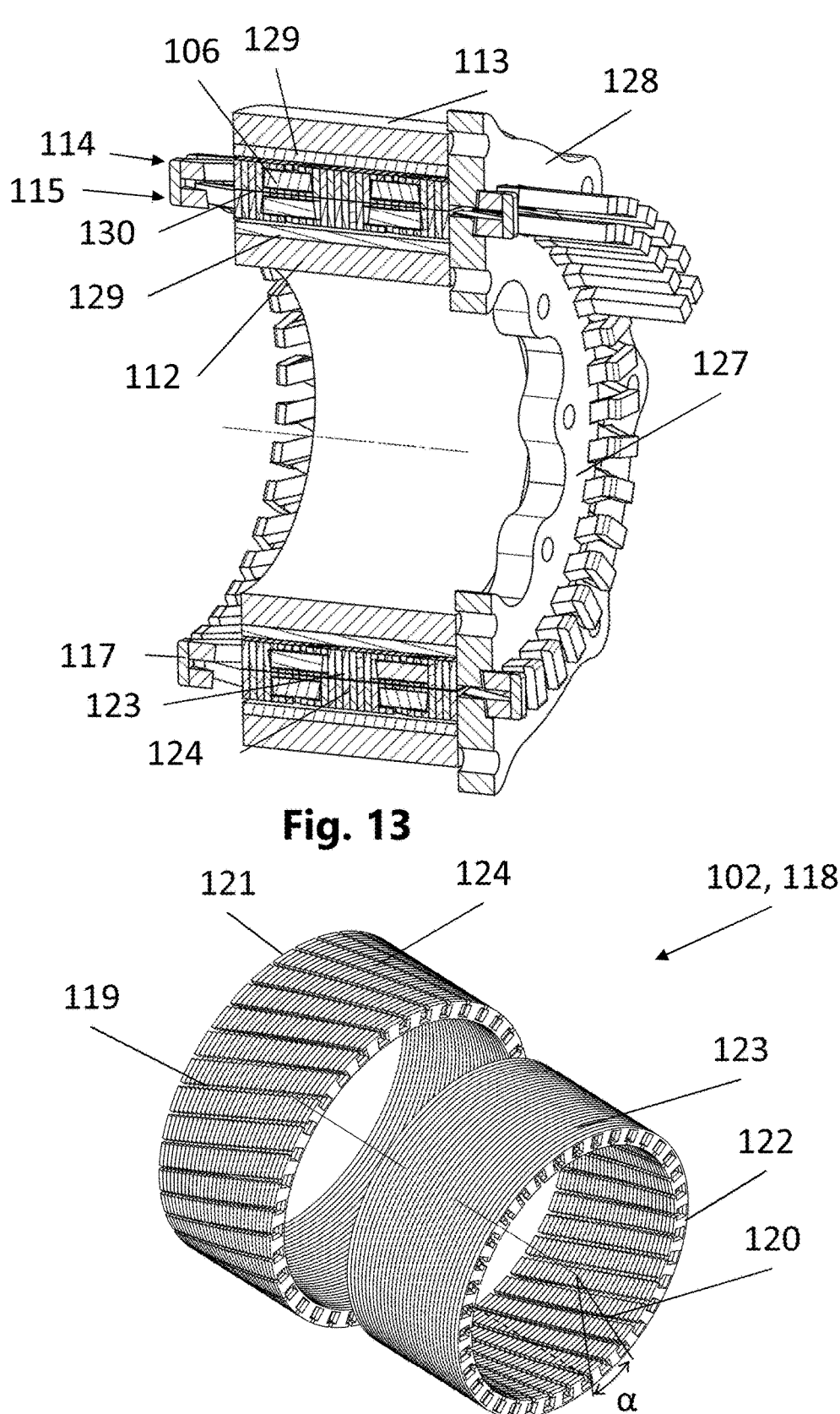
FIG. 13 shows a perspective longitudinal sectional view of a radial flux double-rotor machine according to a still further embodiment.
FIG. 14 shows an exploded view of a laminated stator core of a stator core.

FIG. 13 shows a perspective longitudinal sectional view of a radial flux double-rotor machine 110 according to a still further embodiment.

This embodiment corresponds substantially to the assembly of a radial flux double-rotor machine 110 shown in FIG. 10, the components of which will be discussed further in detail hereinafter.

The stator core 102 has an inner partial package 123 and an outer partial package 124. The partial packages 123, 124 extend annularly between the first and second rotor 112, 113. The sectional view also makes it possible to see the inner and outer layers 114, 115 of the conductor bars 106 extending within the partial packages 123, 124.

The illustrated radial flux double-rotor machine 110 is a so-called "yokeless" design, in which the yoke does not lie between two teeth in functionally relevant magnetic flux. Therefore, although a stator yoke 130 extends between the conductor bars 106, it serves merely to hold the laminated stator core 118 mechanically together. A radial yoke thickness can be configured correspondingly thinly and, in the illustrated embodiment, amounts by way of example to approximately 10% of the entire radial stator thickness. In addition, with the comparatively small yoke thickness undesired magnetic leakage flux in the yoke is reduced. In further embodiments, the radial yoke thickness can be for this purpose less than 30%, preferably less than 20%, particularly preferably less than 10% of the entire radial stator thickness.

The support device 105 also has an inner support element 127 and an outer support element 128. In this case, it can be clearly seen that the support elements 127, 128 are arranged axially offset with respect to the stator 101 and the rotors 112, 113. Furthermore, at least sections of the form-fitting engagement of the support elements 127, 128 with the conductor bars 106 of the inner and outer layers 114, 115 can be seen.

In this case, it can also be clearly seen that the conductor bars 106 of the inner and outer layers 114, 115 are connected at the conductor bar ends 116 via a radially arranged conductor bar piece 117. The connection is produced for example as an integrally bonded connection, e.g. by means of laser beam welding.

Furthermore, the surface magnets of the rotors 112, 113 can be seen in cross-section. The first rotor 112 has, on its outer peripheral surface, a plurality of permanent magnets. The second rotor 113 has, on its inner peripheral surface, a plurality of permanent magnets.

A particularly advantageous embodiment is provided if the rotors consist of soft magnetic solid material and are produced having surface-mounted permanent magnets. In this design, the rotors can be manufactured very cost-effectively and a high degree of efficiency can be achieved.

FIG. 14 shows an exploded view of the laminated stator core 118 of the stator core 102.

The laminated stator core 118 of the stator core 102 has, as already mentioned, an inner partial package 123 and an outer partial package 124. This serves to simplify the production of the stator grooves 119, which are rotated in opposite directions with respect to one another, with the same inner and outer stator sheets 121, 122 which are stacked in a rotated manner with respect to one another and are provided with recesses at the same locations.

In further embodiments, the stator sheets can also be formed in one part, so that a multiplicity of differently formed stator sheets are provided having differently arranged recesses and are stacked in the sequence necessary for forming the stator grooves. In yet further embodiments, it is also feasible to have completely one-part stator cores 102 which can be manufactured e.g. additively.

In the illustrated two-part design, an inner diameter of the outer partial package 124 is almost equal to the outer diameter of the inner partial package 123. This renders it possible to arrange the inner partial package 123 coaxially within the outer partial package 124.

The partial packages 123, 124 are constructed from individual annular stator sheets 121, 122 which are stacked one on top of the other. The stator sheets 121 of the outer partial package 124 are manufactured with recesses, which are positioned distributed on the outer periphery, in order to form the outer stator grooves 119. The stator sheets 122 of the inner partial package 123 are manufactured with recesses, which are positioned distributed on the inner periphery, in order to form the inner stator grooves 120. For example, manufacture of such stator sheets by punching is advantageous by reason of the edge quality and very low production costs.

The inner and outer stator grooves 119, 120 describe helical lines which extend oppositely with respect to one another with the same pitch and are characterised by the indicated swept angle of the stator grooves a. The swept angle of the stator grooves a can be defined from the angle between the position of the same stator groove on one axial side of the stator core 102 and on the other axial side of the stator core 102 in relation to the centre axis M.

In this case, the stator grooves 119, 120 are designed by way of example as T-grooves having a rectangular recess with a tapered opening. They are provided in particular for receiving conductor bars having a rectangular cross-section in a form-fitting manner. Of course, the geometry of the recesses or stator grooves can be adapted to the conductor geometry. Other cross-sectional shapes would also be feasible for this purpose.

Figure 15:
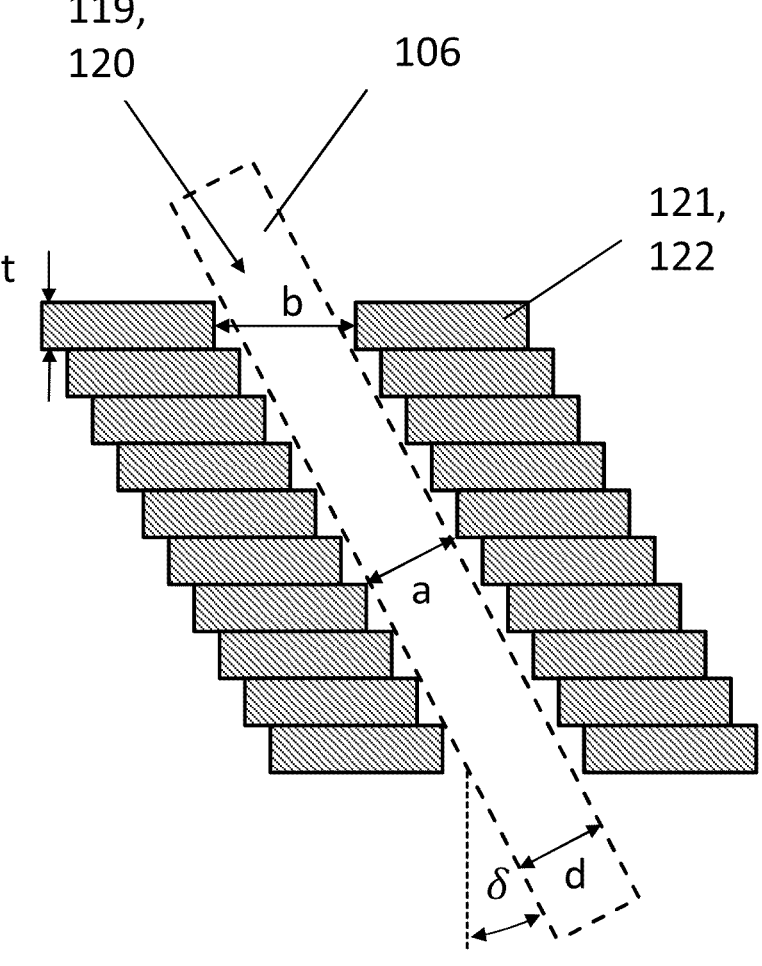
FIG. 15 shows a schematic longitudinal sectional view of a stator groove.

FIG. 15 shows a schematic longitudinal sectional view of a stator groove 119, 120.

The usable or continuous clear width a of the stator grooves 119, 120 within the laminated stator core 118 is substantially equal to the width of the conductor bars 106 received within the stator core 102.

The stator sheets 121, 122 have straight, in particular punched, edges. By reason of the offset of the sheets with respect to one another, a width b of the recesses provided for the stator grooves 119, 120 is larger than the width d of the conductor bars 106 by an amount which is predetermined by the pitch δ of the helical shape of the course and the sheet thickness t.

Figure 16:
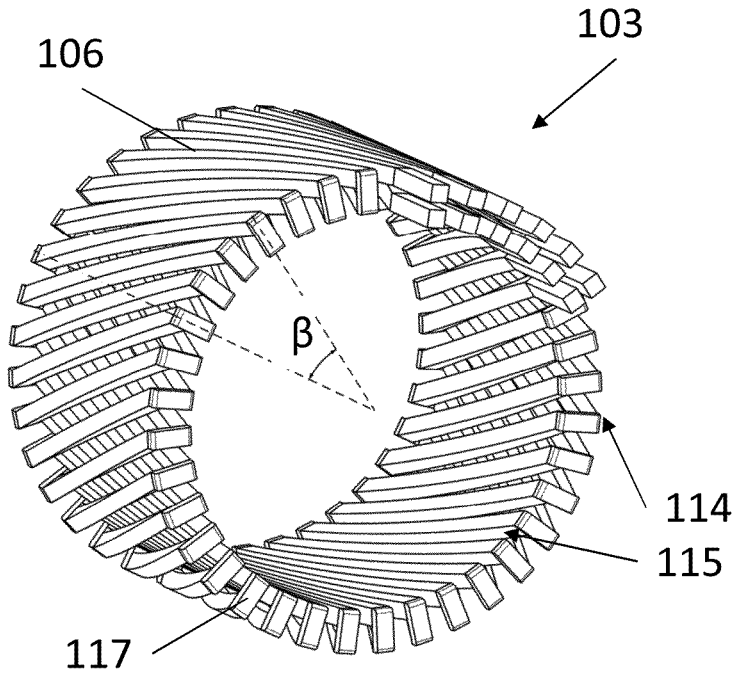
FIG. 16 shows a perspective view of a winding.

In FIG. 16, a conductor bar 106 is schematically indicated with dashed lines in the stator groove 119, 120, wherein, in order to provide a clearance fit, the continuous clear width a of the stator groove 119, 120 is slightly larger than the width d of the conductor bar 106 and the width a of the recess in the stator sheet 121, 122 is, in turn, considerably larger than the clear width b.

The sheet thickness t and the setting angle δ of the pitch of the groove course represent a noticeable influencing factor for the difference between the width b of the recess and the clear width a of the usable passage within the groove in the case of straight, e.g. punched, sheet edges. The difference comes about because the pitch angle on the one hand and the staircase-like stepped configuration of the laminated core on the other hand are to be compensated for.

In this case, a minimum size of the width a of the recess for the limit case of infinitely thin sheets, i.e. a pure consideration of the pitch angle δ of the conductor bar, would be $$b = 1/\cos(\delta) * d.$$

In order, on the one hand, to compensate for the actual sheet thickness and, on the other hand, to provide a clearance fit which allows the insertion of the conductor bars, the width b of the recess is actually provided to be even larger.

The width b of the recesses shown in FIG. 15 is dimensioned in such a way that a clear width a of the stator grooves 119, 120, which is reduced by the offset between the recesses of the stator sheets, forms a predetermined clearance fit with the width d of a conductor bar 106 to be introduced into the stator groove, but the contact is nevertheless close enough to serve for uniformly distributed power transmission or torque support between the laminated stator core and the winding. Such dimensioning is made possible, inter alia, by virtue of the fact that, on the one hand, each stator sheet is formed identically with a high edge quality and is rotated with the same offset, and, on the other hand, only an individual conductor bar 106 is placed in each stator groove 119, 120, the dimensions of said conductor bar being constant.

In particular, in the illustrated embodiment the conductor bar 106 is a rectangular bar having an edge length or width of several millimetres, e.g. in the range of 2 mm to 6 mm, in particular in the range of 3 mm to 5 mm. For example, this can be a rectangular profile of 5 mm×3 mm.

FIG. 16 shows a perspective view of a winding 103.

The winding 103 is constructed from said conductor bars 106 which extend helically along the centre axis M. For this purpose, the conductor bars 106 are not only arranged in a correspondingly interlaced manner, but are also twisted in one another according to the helical line course.

The swept angle β of the conductor bars 106 identifies the angle between the start and end of a conductor bar 106 relative to the centre axis M. Since the pitch of the helical line of the conductor bars 106 is equal to the pitch of the helical line of the stator grooves 119, 120, but the conductor bars 106 are longer than the stator grooves, a ratio of the respective swept angles α and β can be formed in order to characterise the geometric relationships, which is also referred to as the pole coverage degree. In order to provide an optimum between magnetic losses and torque utilisation of a radial flux double-rotor machine, this ratio (pole coverage degree) is preferably in a range between 0.6 and 0.75.

The opposed rotation and torsion of the inner and outer radial layers 114, 115 of conductor bars 106 can likewise be seen in this case. The torsion is configured such that the cross-section in relation to a radial line through the centre of the conductor bar is always identical at each point on the conductor rod, as also defined as 2.5 D geometry. Therefore, the conductor bar ends of the inner and outer layers 114, 115 are arranged in an identical orientation one above the other. The conductor bars 106 of the radial inner and outer layers 114, 115 can thus be conductively connected in a simple manner, in this case by way of example via a radially extending conductor bar piece 117 which is welded to the conductor bars 106.

It is to be noted that the winding illustrated here is produced per se not individually but instead always in combination with the stator core 102, which will be discussed in greater detail in relation to FIG. 20.

Figure 17:
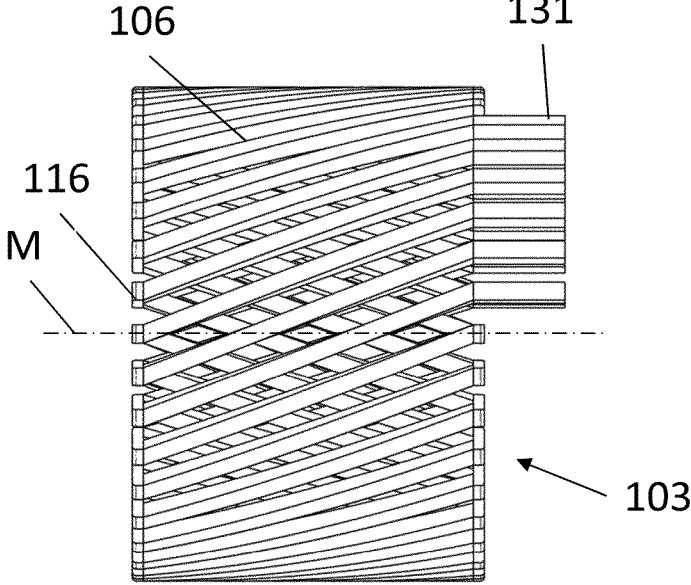
FIG. 17 shows a plan view of a winding.

FIG. 17 shows a plan view of a winding 103.

In this view, it is clear to see the exactly radial orientation of the conductor bars at each point of the helical course thereof which, in the illustrated perspective, is aligned in the region of the centre axis M. The conductor bar ends 116 form in each case the connection point between the inner and outer radial layer 114, 115.

In the illustrated embodiment, the winding has by way of example a total of twelve connection contacts 31. In the case of a three-strand interconnection, a three-phase operation is preferably provided. However, the winding can be adapted in a manner known to a person skilled in the art to other interconnections to form a rotational field-generating winding with any number of strands.

Figure 18:
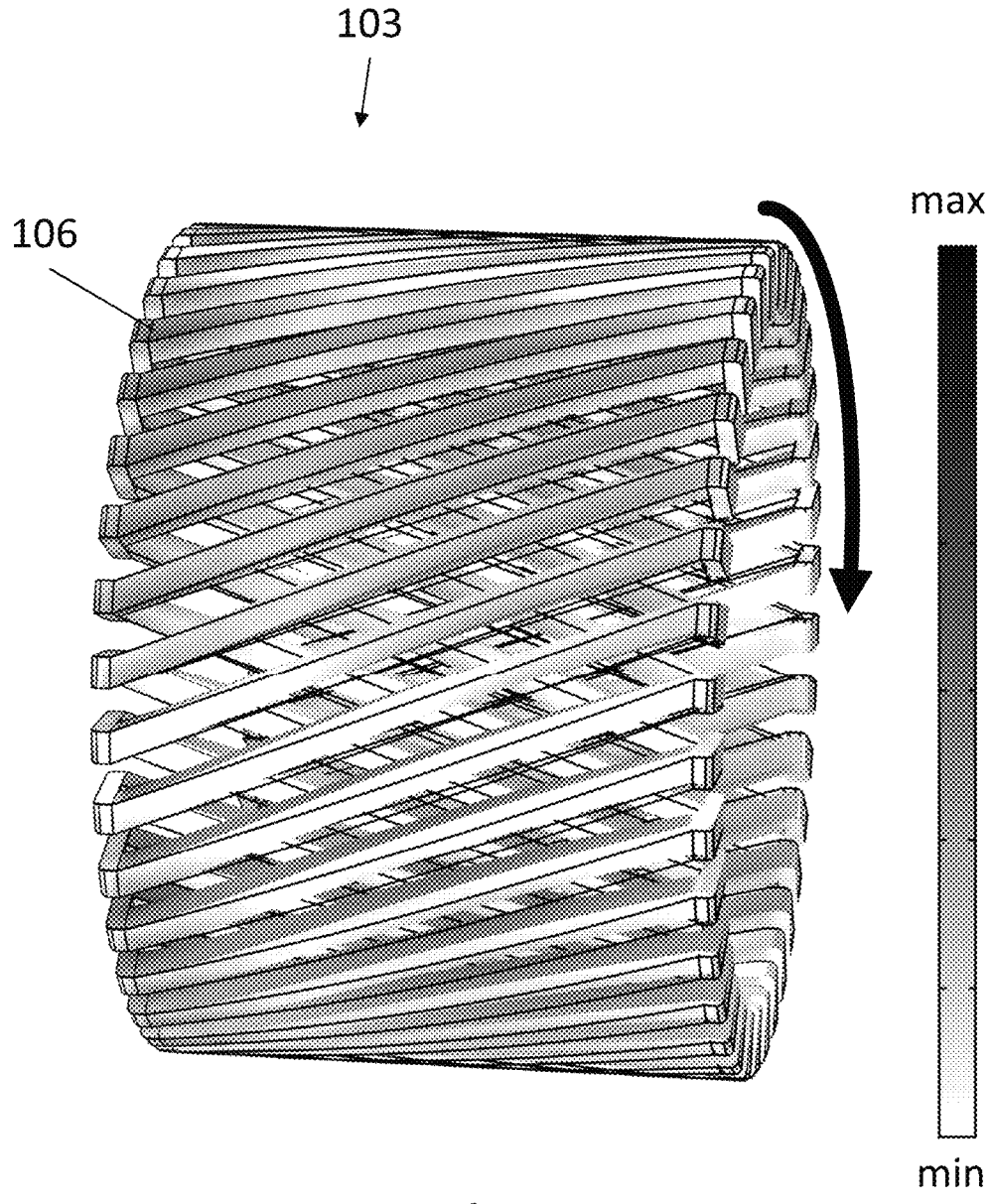
FIG. 18 shows a perspective view of an FEM simulation of a winding under load.

FIG. 18 shows a perspective view of an FEM simulation of a winding 103 under load.

With minor simplifications for simulation purposes, this is essentially the winding geometry illustrated in FIG. 16. The scale illustrated relates to the stresses within the winding, wherein, by way of example, in the case of a rectangular profile of the conductor bars 106 of 5 mm×3 mm, this can be a scale of 0 MPa to 30 MPa.

In this example, the conductor bar ends are defined by means of a swept angle of the conductor bars β>0, i.e. helically arranged and formed or formed in a correspondingly twisted manner. At the axial end, on which the carrier device engages, a maximum torque of the correspondingly dimensioned radial flux double-rotor machine 110, as indicated by a thick arrow, is plotted, wherein, by way of example, in the case of a rectangular profile of the conductor bars 106 of 5 mm×3 mm, this can be more than 1000 Nm, in particular more than 1500 Nm, in a specific example about 2000 Nm, in another specific example about 5000 Nm.

It is evident that the stresses within the winding are distributed very homogeneously by reason of the helical line geometry. In spite of the set significant exaggeration, a deformation can scarcely be seen. Therefore, by reason of this design stress peaks and thus also the deformation are considerably reduced.

By reason of the bar structure-like construction, a high torque can thus be absorbed by the winding 103 in a self-supporting manner when fixing an axially accessible winding end, without causing unacceptably large deformations and/or stress states. This can be attributed in particular to the fact that in the bar structure, the conductor bars 106 predominantly absorb tensile and compressive stresses when subjected to tangential force.

When compared to designs with axis-parallel, straight conductors, the mechanical stresses can thus be significantly reduced.

Figure 19:
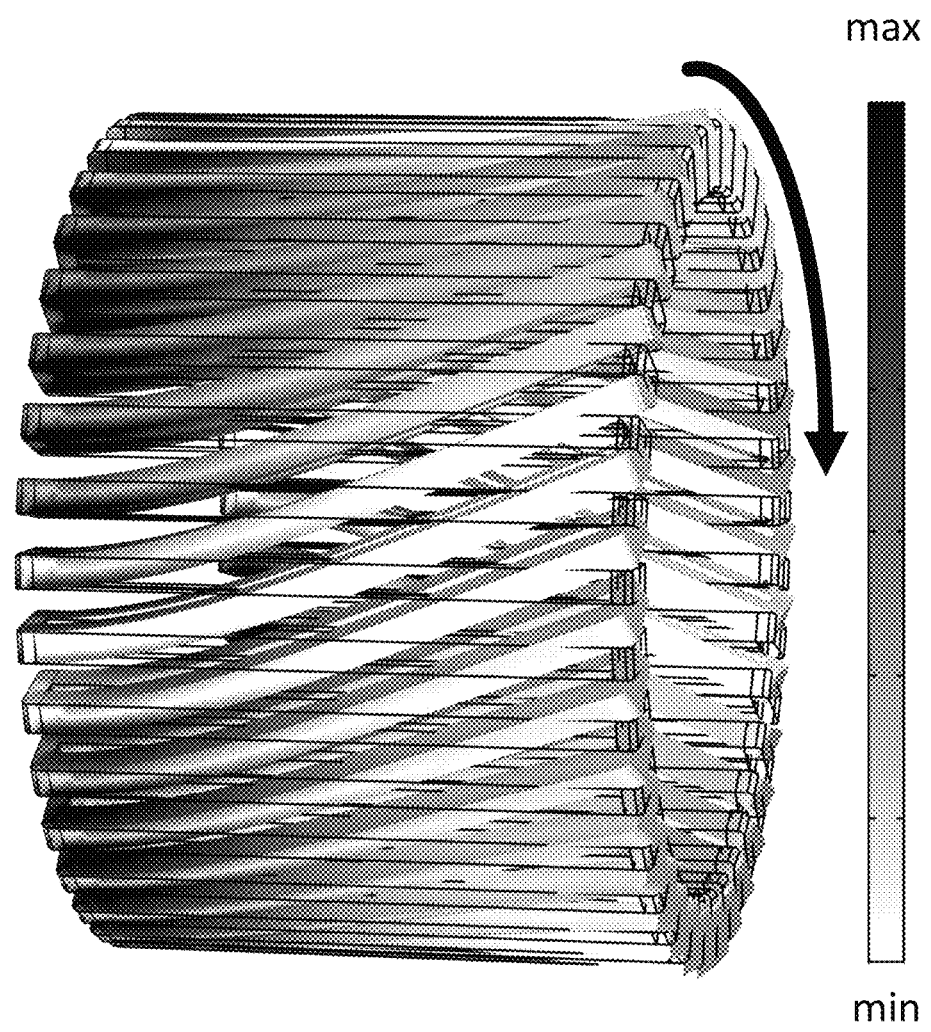
FIG. 19 shows a perspective view of an FEM simulation of a comparative winding under load with the conductor bars having a straight design.

FIG. 19 shows a perspective view of a comparative model with a straight design and axial course of the conductor bars 106 under load.

In comparison with FIG. 18, by reason of the straight design and the axial course of the conductor bars, a stress course concentrated on the side illustrated in FIG. 18 on the left and a strong deformation of the conductor bars resulting from the locally high stress with a large deflection on the side illustrated in FIG. 19 on the right can be seen. Here, the same stress scale and the same exaggeration in deformation are set as in FIG. 18, which shows the effect of the different structural arrangements on the torsion stiffness.

Figure 20:
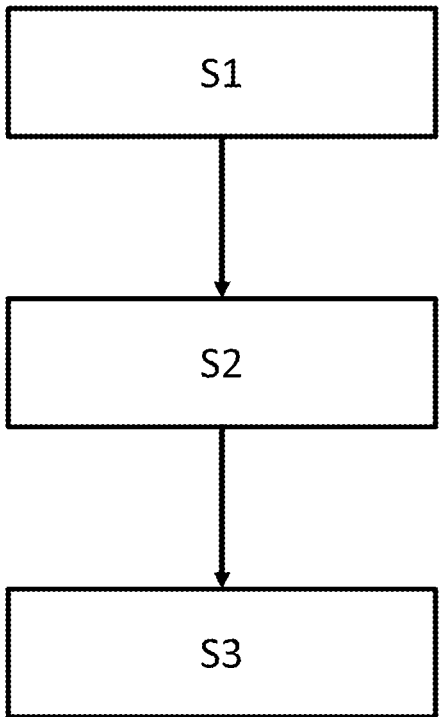
FIG. 20 shows a flow diagram of a method for producing a stator.

FIG. 20 shows a flow diagram of a method for producing a stator 1.

The method comprises a first step of providing S1 a stator core 102 having radially outer stator grooves 119 each describing a helical line and radially inner stator grooves 120 each describing a helical line with an opposite turning direction. A further step concerns introducing S2 individual conductor bars 106 following the helical lines through the inner and outer stator grooves 119, 120. The conductor bars are introduced in particular in an axial direction. Furthermore, a step is provided of connecting S3 the conductor bars 106, which are introduced into the inner and outer stator grooves, on the conductor bar ends 116 in order to form conductor loops.

Although the present invention has been described in full above with the aid of exemplified embodiments, it is not limited thereto but can be modified in diverse ways.

The invention claimed is:

1. An electric drive system for or in a motor vehicle, comprising:
    at least one synchronous machine which has a double rotor and a distributed winding placed in a stator core, wherein the double rotor is constructed from flux-carrying material consisting of solid material, wherein the winding is designed to be self-supporting for torque support; and
    at least one three-level or multi-level inverter circuit which is coupled to the synchronous machine at a load output and which is designed to convert a direct voltage received on the supply side into an alternating voltage, via which the synchronous machine can be driven via the load output, wherein the inverter circuit has a controllable three-level or multi-level inverter,
    wherein the winding protrudes, at least one axial end, beyond the stator core and a support device is provided which is arranged axially offset with respect to the stator core and is designed for form-fitting engagement with the winding at the at least one axial end for torque support.

2. The drive system of claim 1,
wherein the synchronous machine is a wheel hub motor for an electrically operable motor vehicle.

3. The drive system of claim 1,
wherein the synchronous machine is designed as a radial flux double-rotor machine.

4. The drive system of claim 1,
wherein the synchronous machine has a mechanically fixed base, wherein the support device is in form-fitting engagement with the at least one axial end of the winding for torque support and is supported on the base.

5. The drive system of claim 1,
wherein the double rotor has a first rotor consisting of solid material arranged radially within the stator core, and a second rotor consisting of solid material arranged radially outside the stator core.

6. The drive system of claim 1,
wherein the flux-carrying material in the rotor consists of iron or an iron alloy.

7. The drive system of claim 1, wherein the inverter circuit has an operating mode setting device which is designed to change the inverter from three-level or multi-level operation to two-level operation and vice versa in dependence upon an overall efficiency of the electric drive system, wherein the overall efficiency is a function of the detected phase current of the synchronous machine as well as at least one further parameter or property of the synchronous machine influencing the overall efficiency.

8. An electric drive system for or in a motor vehicle, comprising:

at least one synchronous machine which has a double rotor and a distributed winding placed in a stator core, wherein the double rotor is constructed from flux-carrying material consisting of solid material, wherein the winding is designed to be self-supporting for torque support; and at least one three-level or multi-level inverter circuit which is coupled to the synchronous machine at a load output and which is designed to convert a direct voltage received on the supply side into an alternating voltage, via which the synchronous machine can be driven via the load output, wherein the inverter circuit has a controllable three-level or multi-level inverter, wherein the inverter circuit has an operating mode setting device which is designed to change the inverter from three-level or multi-level operation to two-level operation and vice versa in dependence upon an overall efficiency of the electric drive system, wherein the overall efficiency is a sole function of the detected phase current of the synchronous machine or a function of at least one further property of the synchronous machine influencing the overall efficiency.

9. An electric drive system for or in a motor vehicle, comprising:

at least one synchronous machine which has a double rotor and a distributed winding placed in a stator core, wherein the double rotor is constructed from flux-carrying material consisting of solid material, wherein the winding is designed to be self-supporting for torque support; and at least one three-level or multi-level inverter circuit which is coupled to the synchronous machine at a load output and which is designed to convert a direct voltage received on the supply side into an alternating voltage, via which the synchronous machine can be driven via the load output, wherein the inverter circuit has a controllable three-level or multi-level inverter, wherein the inverter has a first driver level and at least one second driver level, wherein the second driver level is designed to carry output load currents to the load output which are smaller than the output load currents provided by the first driver level.

10. The drive system of claim 9, wherein the operating mode setting device has a control device which is designed to control the inverter such that the first driver level and the second driver level are activated in three-level or multi-level operation and at least one of the driver levels is deactivated in two-level operation.

11. The drive system of claim 9, wherein the first driver level has at least one bridge circuit, in particular a half-bridge circuit, of which the centre tap forms the output load connection of the inverter circuit, wherein each bridge circuit has at least one first power switch which is connected to a first supply connection and which is designed to provide a first voltage level at the load output, and wherein each bridge circuit also has at least one second power switch which is connected to a second supply connection and which is designed to provide a second voltage level at the load output.

12. The drive system of claim 9, wherein the second driver level has at least one third power switch, of which the load paths are connected in series between an intermediate circuit and the centre tap of the first driver circuit and which are designed to provide a third voltage level at the load output, said third voltage level being between the first and the second voltage level.

13. The drive system of claim 8, wherein the operating mode setting device has an evaluation device which is designed to optimise the overall efficiency on the basis of the phase current or the at least one further property.

14. The drive system of claim 1, wherein the inverter includes a t-type neutral point clamped inverter architecture.

15. The drive system of claim 3, wherein the winding is designed to be torsionally stiff such that a torque acting upon the stator core during the operation of the radial flux double-rotor machine can be supported via the torsionally stiff winding on the support device.

16. The drive system of claim 15, wherein the stator core is designed to carry a primarily radial magnetic flux.

17. The drive system of claim 16, wherein the stator core has a radial yoke thickness which is less than 30% or less than 20% or less than 10% of an overall radial stator core thickness.

18. The drive system of claim 1, wherein the winding is formed from conductor bars which are connected together in the manner of a bar structure.

19. The drive system of claim 18, wherein the winding has a radially inner layer of helically arranged conductor bars and a radially outer layer of oppositely helically arranged conductor bars.

20. The drive system of claim 19, wherein the radially inner layer and the radially outer layer of the winding have in each case the thickness of an individual conductor bar.

21. The drive system of claim 19, wherein the conductor bars are each twisted corresponding to the helical course such that a cross-section of a conductor bar is the same at each point of the conductor in relation to a radial axis of the cross-section.

22. The drive system of claim 19, wherein the conductor bars of the radially inner and outer layer associated with the same phase of the winding are connected together in each case at the conductor bar ends.

23. The drive system of claim 19, wherein the stator core contains a laminated stator core with stator grooves extending helically corresponding to the winding course, wherein an individual conductor bar is arranged in each stator groove of the laminated stator core.

24. The drive system of claim 19, wherein the support device has a support element, in which support grooves are provided which correspond to the helical arrangement of the conductor bars and are in engagement with the conductor bars.

25. The drive system of claim 21, wherein the support grooves follow, at least in sections, the helical course of the twisted conductor bars.

* * * * *